United States Patent
Seo

(10) Patent No.: US 11,992,834 B2
(45) Date of Patent: May 28, 2024

(54) SAMPLE ANALYSIS CHIP, SAMPLE ANALYSIS DEVICE CONTAINING SAME, AND CARTRIDGE MOUNTED ON SAMPLE ANALYSIS CHIP

(71) Applicant: UNIVERSITY-INDUSTRY COOPERATION GROUP OF KYUNG HEE UNIVERSITY, Yongin (KR)

(72) Inventor: Tae Seok Seo, Suwon (KR)

(*) Notice: Subject to any disclaimer, the term of this patent is extended or adjusted under 35 U.S.C. 154(b) by 290 days.

(21) Appl. No.: 16/639,565

(22) PCT Filed: Aug. 24, 2018

(86) PCT No.: PCT/KR2018/009807
§ 371 (c)(1),
(2) Date: Feb. 15, 2020

(87) PCT Pub. No.: WO2019/039911
PCT Pub. Date: Feb. 28, 2019

(65) Prior Publication Data
US 2021/0129130 A1 May 6, 2021

(30) Foreign Application Priority Data

Aug. 24, 2017 (KR) .......................... 10-2017-0107126

(51) Int. Cl.
*B01L 3/00* (2006.01)
*G01N 35/08* (2006.01)

(52) U.S. Cl.
CPC .............. *B01L 3/502* (2013.01); *G01N 35/08* (2013.01); *B01L 2200/10* (2013.01); *B01L 2300/0819* (2013.01)

(58) Field of Classification Search
CPC ................. B01L 3/502; B01L 2200/10; B01L 2300/0819; C12Q 1/68; C12Q 1/6844;
(Continued)

(56) References Cited

U.S. PATENT DOCUMENTS

| 7,935,318 B2 * | 5/2011 | Harding | G01N 35/025 422/507 |
| 8,703,070 B1 * | 4/2014 | Parng | G01N 21/6452 436/805 |

(Continued)

FOREIGN PATENT DOCUMENTS

| JP | 2004-012290 A | 1/2004 |
| KR | 10-1484408 B | 1/2015 |

(Continued)

OTHER PUBLICATIONS

English translation of KR_20150145162 (Year: 2015).*
(Continued)

*Primary Examiner* — Matthew D Krcha
*Assistant Examiner* — Tingchen Shi

(57) ABSTRACT

A chip for sample analysis is provided. The chip for sample analysis according to an embodiment of the present application includes a sample storage unit, a capture path configured to capture an analyte contained in a sample and communicating with the sample storage unit, a washing solution storage unit communicating with the capture path and a delay unit included between the capture path and the washing solution storage unit such that a washing solution flowing from the washing solution storage unit to the capture path passes through. When the chip is rotated for sample analysis, the delay unit may be configured to delay the passage of the washing solution introduced from the washing solution storage unit such that the washing solution reaches the capture path later than the sample.

9 Claims, 20 Drawing Sheets

(58) Field of Classification Search
CPC .............. C12Q 1/686; C12Q 2565/625; C12Q 2565/629; C12Q 2565/631
See application file for complete search history.

(56) References Cited

U.S. PATENT DOCUMENTS

| 10,539,583 | B2 * | 1/2020 | Okamoto | ........... G01N 35/0098 |
| 2015/0292038 | A1 * | 10/2015 | Seo | ....... B01L 7/5255 |
| | | | | 435/6.12 |

FOREIGN PATENT DOCUMENTS

| KR | 101484408 B1 * | 1/2015 | .......... B01L 2200/10 |
| KR | 10-2015-0031912 A | 3/2015 | |
| KR | 20150031912 A * | 3/2015 | |
| KR | 10-2015-0145162 A | 12/2015 | |
| KR | 20150145162 A * | 12/2015 | |

OTHER PUBLICATIONS

English translation of KR_20150031912 (Year: 2015).*
International Search Report for PCT/KR2018/009807 dated Mar. 22, 2019.
Seung Jun Oh et al., Fully automated and colorimetric foodborne pathogen detection on an integrated centrifugal microfluidic device, The Royal Society of Chemistry, Apr. 15, 2016, pp. 1-10.
He Yan et al., Multiplex detection of bacteria on an integrated centrifugal disk using bead-beating lysis and oopmediated amplification, Scientific Reports, May 3, 2017, pp. 1-11.
Maximilian Focke et al., Centrifugal microfluidic system for primary amplification and secondary real-time PCR, The Royal Society of Chemistry, Oct. 11, 2010, pp. 3210-3212.

* cited by examiner

[FIG. 3]

SAMPLE ANALYSIS CHIP, SAMPLE ANALYSIS DEVICE CONTAINING SAME, AND CARTRIDGE MOUNTED ON SAMPLE ANALYSIS CHIP

CROSS REFERENCE TO RELATED APPLICATIONS

This application claims priority to Korean Patent Application No. 10-2017-0107126, filed on Aug. 24, 2017. Further, the application is the National Phase application of International Application No. PCT/KR2018/009807, filed on Aug. 24, 2018, which designates the United States. Each of these applications is hereby incorporated by reference in their entirety into the present application.

TECHNICAL FIELD

The present application relates to a device for sample analysis.

BACKGROUND ART

Genetic diagnosis is essential for the diagnosis of bacterial or viral diseases.

Genetic diagnosis is performed by a total of four steps of sampling, sample pretreatment (DNA or RNA extraction), gene amplification and detection.

However, conventionally, since each step is performed by separate equipment or device, there are problems in which an expensive analysis device and a large amount of sample are required, it takes a lot of time for analysis, there is a high possibility of contamination of a sample during diagnosis, and rapid diagnosis is difficult in the field.

To solve these problems, recently, an integrated genetic analysis device using a microfluidic microchip is being developed. It is called a lab-on-a-chip, meaning that a lab environment is implemented on one chip.

However, a conventional integrated genetic analysis device has problems of a high production cost due to a complicated chip structure, metal electrode patterning and a silicon/glass substrate-based structure, operating complexity required for an external input pump and various tube systems, low reproducibility of a highly integrated chip device, an automated member for system driving and a difficulty in point-of-care testing (POCT) due to miniaturization limitations.

As an example, rotary genetic diagnosis devices and systems, which are in the spotlight lately, are instruments that can perform pretreatment of a sample introduced thereinto, gene amplification and detection through rotation of the device. However, a conventional rotary genetic diagnosis device had the following problems:

First, a sample and a washing solution should be sequentially introduced into a DNA or RNA capture path in the sample, and the sample and washing solution are simultaneously introduced into a capture path while the device rotates.

Since the washing solution serves to wash materials except DNA or RNA which is not captured in the capture path, it is preferable that the washing solution is input after all the DNA or RNA is captured in the capture path. When the washing solution is input before the DNA or RNA is captured in the capture path, the accuracy of the analysis is reduced.

Second, it is impossible to diagnose numerous diseases in one device. There are various influenza viruses in the case of avian influenza, and it is necessary to analyze which virus caused the disease.

However, a conventional device can analyze only one virus in one unit process. Therefore, to confirm the presence of viruses in a sample, it takes various devices, manpower and time, the demand for point-of-care testing required for prompt diagnosis is not sufficiently satisfied.

Third, for sample analysis, a solution has to be injected into each storage unit manually. The most important factor for POCT is promptness, but POCT has a risk of contamination when the solution is injected into each storage unit manually and also takes a long time.

Such problems cause a reduction in accuracy of genetic diagnosis, and the necessity for a device solving these problems is increasing.

(Patent Document 1) Korean Unexamined Patent Application No. 10-2015-0031912 (Mar. 25, 2015)

(Patent Document 2) Japanese Unexamined Patent Application No. 2004-012290 (Jan. 15, 2004)

DISCLOSURE

Technical Problem

The present application has been conceived to solve the above problems. Particularly, various viruses may be simultaneously diagnosed by one device at one time, and the present application is directed to providing a chip for sample analysis, which allows a washing solution to reach the capture path later than the sample.

The present application is also directed to providing a cartridge for automatically injecting a solution into the chip for sample analysis.

Technical Solution

To solve the above-described problems, one aspect of the present application provides a chip for sample analysis, which includes: a sample storage unit, a capture path configured to capture an analyte contained in a sample and communicating with the sample storage unit, a washing solution storage unit communicating with the capture path, and a delay unit included between the capture path and the washing solution storage unit such that a washing solution flowing from the washing solution storage unit to the capture path passes through. Here, the delay unit is configured to delay the passage of the washing solution introduced from the washing solution storage unit such that the washing solution reaches the capture path later than the sample, when the chip is rotated for sample analysis.

In one embodiment, the sample storage unit may be located radially inward of the capture path.

The washing solution storage unit may be located radially inward of the sample storage unit.

In one embodiment, the delay unit may include a delay chamber capable of storing the washing solution flowing from the washing solution storage unit to the capture path, and a delay channel included between the delay chamber and the capture path to discharge the washing solution stored in the delay chamber into the capture path when the washing solution is detected at a predetermined amount or more.

In one embodiment, an outlet may be included at the radially outermost side of the delay chamber, and the delay channel may be connected to the outlet of the delay chamber.

In one embodiment, the delay channel may include a first path extending radially inward from the outlet of the delay chamber and a second path extending radially outward from the end of the first path, and the determined amount may be an amount when the height of the washing solution stored in the delay chamber corresponds to the length of the first path.

In one embodiment, the delay unit may be included between the washing solution storage unit and the delay chamber, and further include an introduction channel configured to introduce the washing solution stored in the washing solution storage unit into the delay chamber when the chip is rotated for sample analysis.

In one embodiment, the introduction channel may include a third path extending away from the delay chamber in a direction parallel to the width direction of the delay chamber and a fourth path extending closer to the delay chamber in a direction parallel to the third path at the end of the third path.

In one embodiment, a first eluent storage unit which is located radially inward of the sample storage unit and communicating with the capture path, and contains a first eluent for separating an analyte captured in the capture path and a second eluent storage unit located radially outward of the sample storage unit and storing a second eluent for detecting the analyte therein may be further included.

In one embodiment, a connection chamber located radially outward of the capture path and the second eluent storage unit and communicating with the outlet of the capture path and the second eluent storage unit, a waste solution chamber communicating with the connection chamber to be located radially outward of the connection chamber and storing a sample not captured in the capture path and storing a washing solution passing through the capture path when the chip is rotated for sample analysis, and a collection chamber communicating with the connection chamber to be located radially outward of the connection chamber and storing an analyte separated from the first eluent, the first eluent passing through the capture path and the second eluent, when the chip is rotated for sample analysis, may be further included.

In one embodiment, an injection hole for solution injection may be formed in each of the sample storage unit, the washing solution storage unit, the first eluent storage unit and the second eluent storage unit.

In addition, the present application provides a chip for sample analysis, which includes a sample storage unit, a pretreatment unit configured to perform a pretreatment process including capturing, washing and separation of an analyte contained in a sample and configured to communicate with the sample storage unit, and a plurality of detection chambers located radially outward of the pretreatment unit, configured to introduce the analyte pretreated by the pretreatment unit, and storing different primers for detecting the analyte.

In one embodiment, an introduction channel which is located radially inward of the plurality of detection chambers, such that the analyte pretreated in the pretreatment unit is introduced when the chip is rotated with a first rotation speed in a first direction for sample analysis, and a plurality of connection channels extending from a plurality of outlets of the introduction channel to the plurality of detection chambers, respectively, such that the analyte introduced from the introduction channel to the detection chamber passes through, when the chip is rotated with a second rotation speed in the first direction for sample analysis, may be further included. The introduction channel may extend from an inlet into which an analyte is introduced from the pretreatment unit in the first direction.

In one embodiment, to introduce an analyte into the detection chamber when the chip is rotated at the second rotation speed in the first direction, the width of at least one of the plurality of connection channels may be smaller than that of the outlet of the corresponding introduction channel.

In one embodiment, among the plurality of connection channels, as a connection channel is further from the pretreatment unit, it may be shorter.

In one embodiment, the second rotation speed may be higher than the first rotation speed.

In one embodiment, when the chip is rotated for sample analysis, a through-hole corresponding to a rotation shaft is formed in the center of the chip for sample analysis, a distance between one of at least two of the plurality of detection chambers and the through-hole is the same. Among the plurality of connection channels, as a connection channel is further from the pretreatment unit, it may be shorter.

In addition, the present application provides a device for sample analysis, which includes a chip for sample analysis, a lower member on which the chip for sample analysis is mounted and which includes a temperature adjustment unit on a top surface, an upper member mounted on the lower member to facilitate up-and-down movement with respect to the lower member and a driving motor mounted under the lower member to rotate the chip for sample analysis. The chip for sample analysis includes a sample storage unit, a capture path configured to capture an analyte contained in a sample and communicating with the sample storage unit, a washing solution storage unit communicating with the capture path, and a delay unit included between the capture path and the washing solution storage unit such that a washing solution flowing from the washing solution storage unit to the capture path passes through. When the chip is rotated for sample analysis, the delay unit is configured to delay the passage of the washing solution introduced from the washing solution storage unit such that the washing solution reaches the capture path later than the sample.

In one embodiment, a through-hole corresponding to a rotation shaft is formed in the center of the chip for sample analysis, and the through-hole may be coupled to a column extending upward from a temperature adjustment unit of the lower member to serve as the rotation shaft when the chip for sample analysis is rotated.

In addition, the present application provides a cartridge, which is mounted on the chip for sample analysis and includes at least one inlet which is inserted into at least one of the sample storage unit, the first eluent storage unit, the second eluent storage unit and the washing solution storage unit of the chip for sample analysis to inject a corresponding solution.

In one embodiment, the at least one inlet may be detachably inserted.

In one embodiment, at least one solution storage unit communicating with the at least one inlet and configured to store a corresponding solution may be further included, wherein the at least one inlet may communicate with at least one solution storage unit at the furthest position from a rotation axis so that the corresponding solution can be injected through the at least one inlet when the chip for sample analysis is rotated.

In one embodiment, the at least one solution storage unit may include a first solution storage unit including a first inlet that can be inserted into the sample storage unit and storing a lysis buffer solution for eluting an analyte contained in a sample, and a second solution storage unit including a second inlet that can be inserted into the washing solution storage unit and storing a washing solution.

In one embodiment, a third solution storage unit including a third inlet that can be inserted into the first eluent storage unit and storing a first eluent and a fourth solution storage unit including a fourth inlet that can be inserted into the second eluent storage unit and storing a second eluent may be further included.

In one embodiment, the first to fourth inlets may be detachably inserted into an injection hole formed in the sample storage unit, an injection hole formed in the washing solution storage unit, an injection hole formed in the first eluent storage unit and an injection hole formed in the second eluent storage unit, respectively.

In one embodiment, the cartridge may be manufactured by 3D printing.

In one embodiment, the cartridge may be manufactured of a disposable plastic material.

Advantageous Effects

According to the present application, due to the configuration of a delay unit included between a washing solution storage unit and a capture path, a washing solution can be introduced into a capture path later than a sample, and thus the washing solution is introduced after the sample is sufficiently captured in the capture path, resulting in an improvement in diagnostic accuracy.

In addition, since a plurality of detection chambers are included, and a different primer is stored in each detection chamber, the diagnosis of various pathogens can be performed in one device.

In addition, by using an EBT indicator whose color is changed when gene amplification is performed, the presence or absence of an analyte in a sample can be easily observed with the naked eye.

In addition, since a solution can be automatically injected into each storage unit by a cartridge detachably mounted on the chip for sample analysis, the time required for conventional diagnosis can be shortened and ease of diagnosis can be improved.

DETAILED DESCRIPTION OF EXEMPLARY EMBODIMENTS

Hereinafter, gene amplification refers to amplification of a gene to be analyzed. Examples of gene amplification may include polymerase chain reaction (PCR), real-time PCR, and isothermal amplification reaction, and it will be mentioned in advance that any reaction of amplifying a gene to be analyzed is included herein without limitation.

1. Chip for Sample Analysis

A chip for sample analysis 1000 according to an embodiment of the present application will be described in detail with reference to the accompanying drawings.

Figure 1:
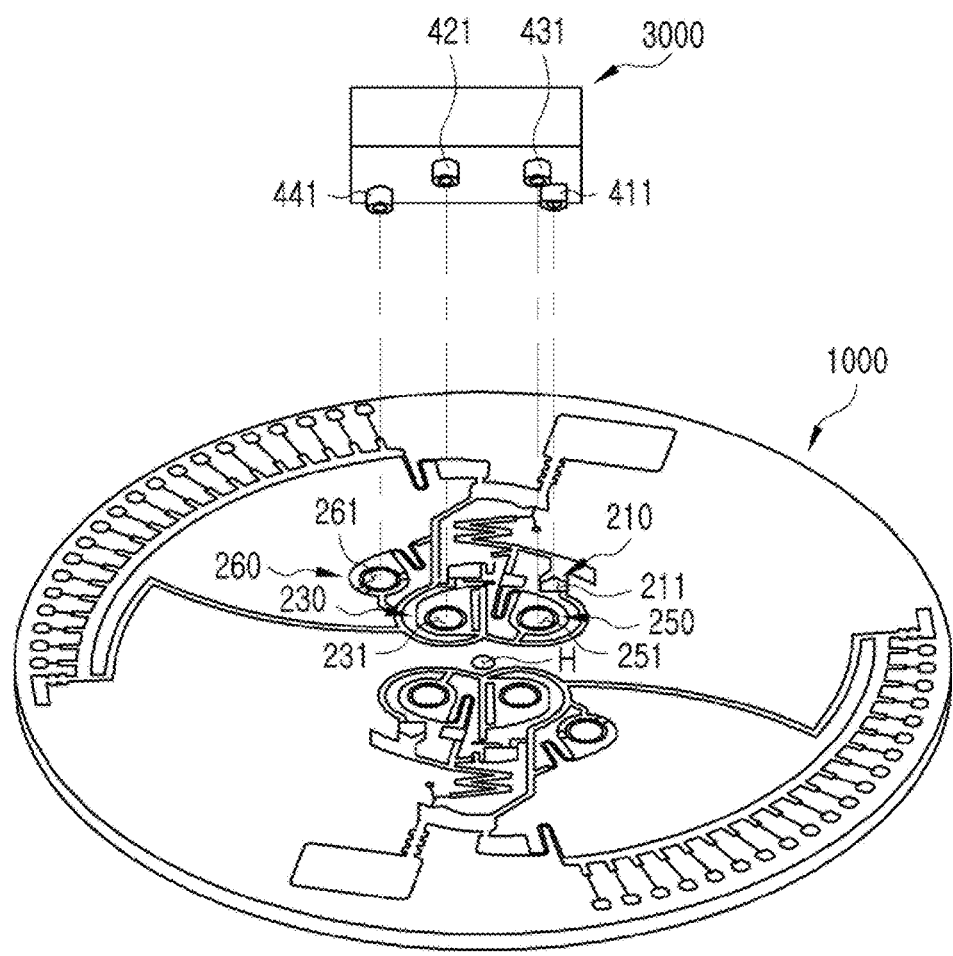
FIG. 1 is an exploded perspective view that illustrates that a chip for sample analysis according to an embodiment of the present application is connected with a cartridge.
Figure 2:
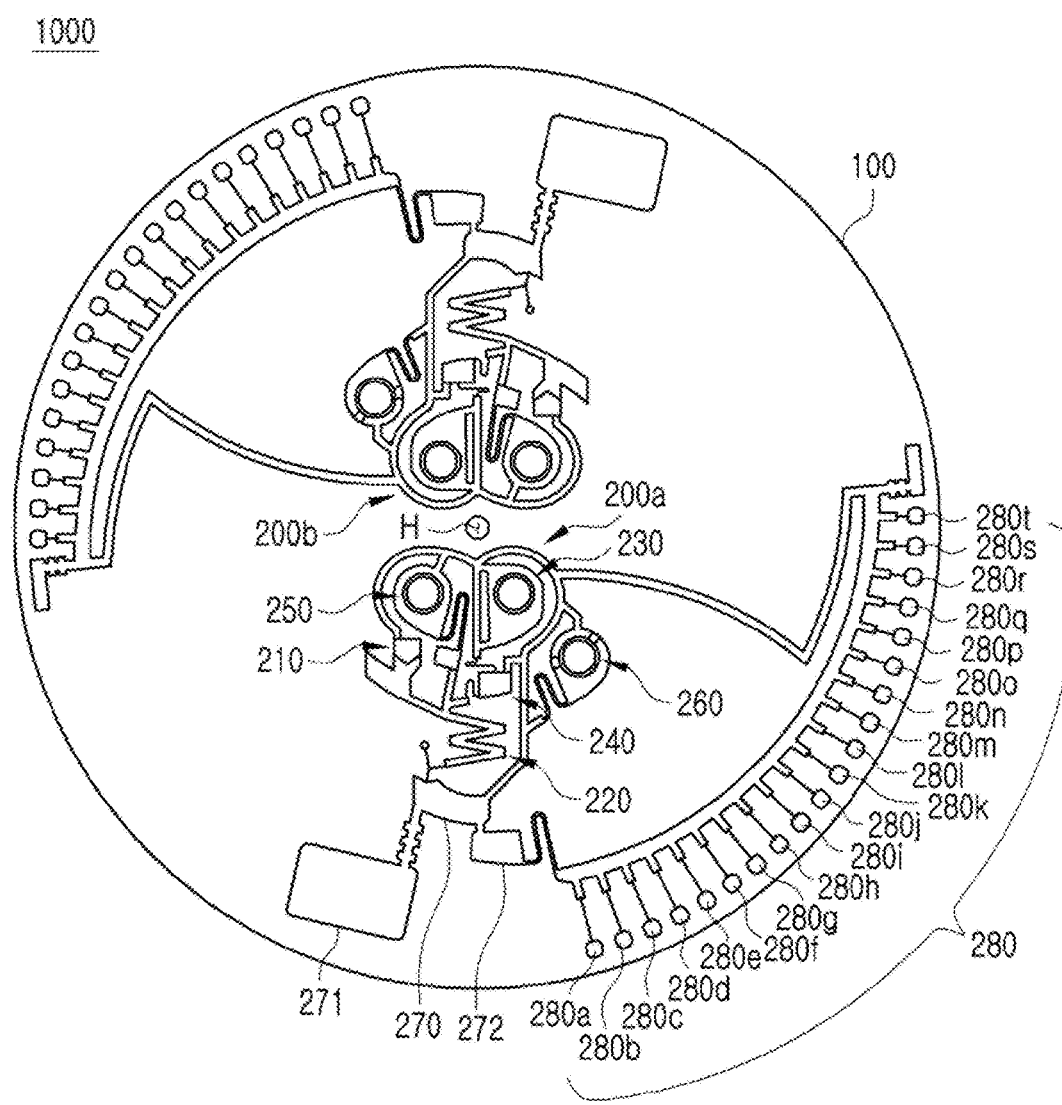
FIG. 2 is a plan view of the chip for sample analysis of FIG. 1.

Referring to FIG. 2, the chip for sample analysis 1000 may have a disk-shaped body 100. A through-hole H is formed in the center of the body 100. The through-hole H is a part corresponding to a rotation axis in rotation by being connected to a device for sample analysis 2000, which will be described below.

The chip for sample analysis 1000 includes multiple integrated process units 200a and 200b, which are sequentially arranged along a circumferential direction. In the following, while it is described that there are two integrated process units, the present application is not limited thereto, and thus it is possible to have two or more integrated process units. Hereinafter, only one integrated process unit will be described in detail.

The chip for sample analysis 1000 may be manufactured by, for example, forming a pattern designed in a groove shape by processing a disk-shaped PMMA surface with a thickness of 3 mm using a CNC milling machine, and adhering PSA to the processed surface.

Figure 3:
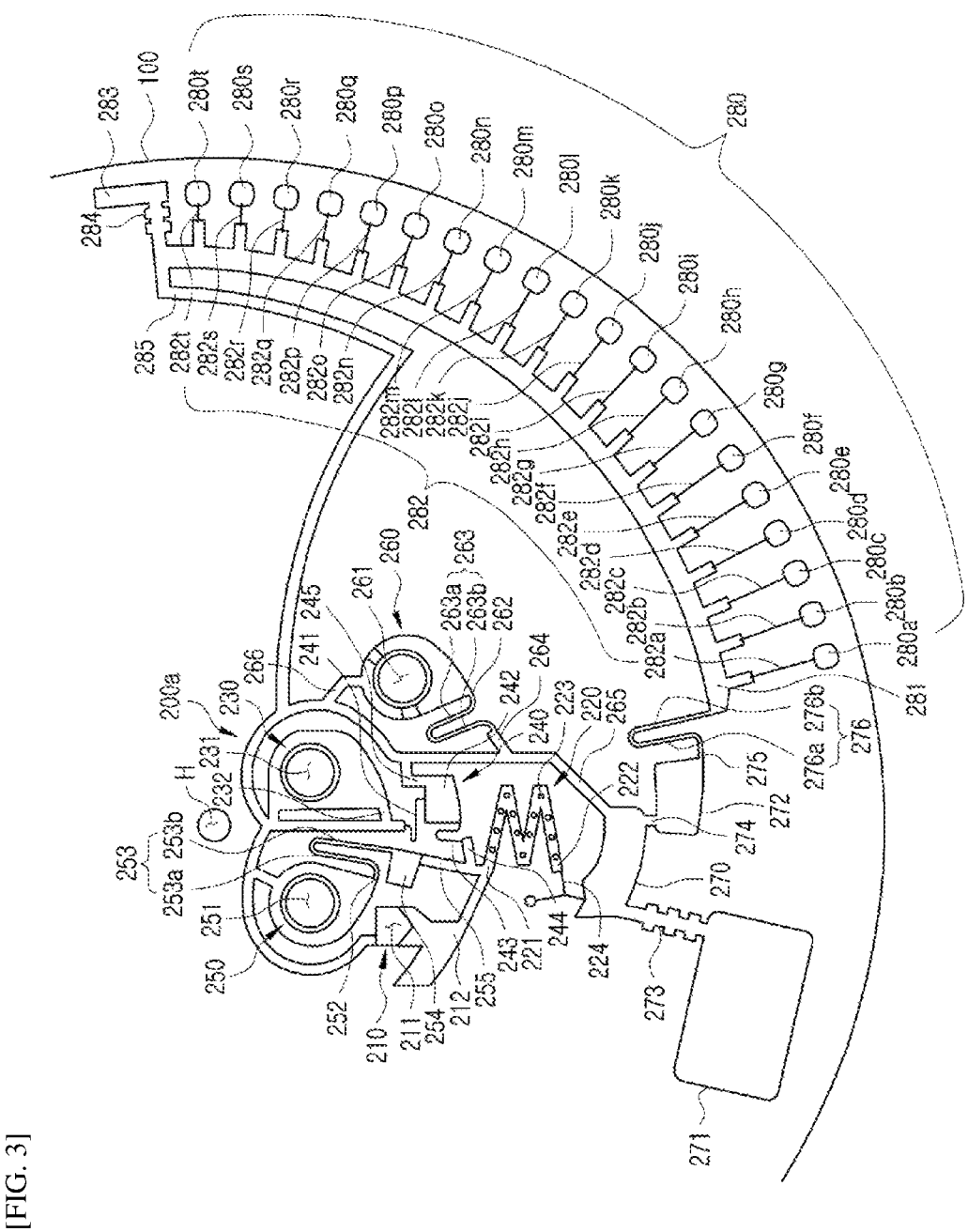
FIG. 3 is a diagram illustrating an enlarged part of the chip for sample analysis of FIG. 2.

The configuration of the integrated process unit will be described in detail with reference to FIGS. 2 and 3.

The integrated process units 200a and 200b according to an embodiment of the present application are formed as a pattern on the body 100, and include a sample storage unit 210, a capture path 220, a washing solution storage unit 230, a delay unit 240, a first eluent storage unit 250, a second eluent storage unit 260, a connection chamber 270 and a plurality of detection chambers 280a, 280b, 280c, 280d, 280e, 280f, 280g, 280h, 280i, 280j, 280k, 280l, 280m, 280n, 280o, 280p, 280q, 280r, 280s and 280t.

The sample storage unit 210 is a chamber type, and located radially inward of an inlet 221 of a capture path 220 to be described and connected with the inlet 221 of the capture path 220. A sample injection hole 211 for sample injection from the outside is formed in the sample storage unit 210. After a sample is injected into the sample storage unit 210 through the sample injection hole 211, the sample injection hole 211 is sealed by coupling with a cartridge 300 to be described below. The sample stored in the sample storage unit 210 is introduced into the inlet 221 of the capture path 220 due to a centrifugal force generated when the chip for sample analysis 1000 is rotated.

Figure 4:
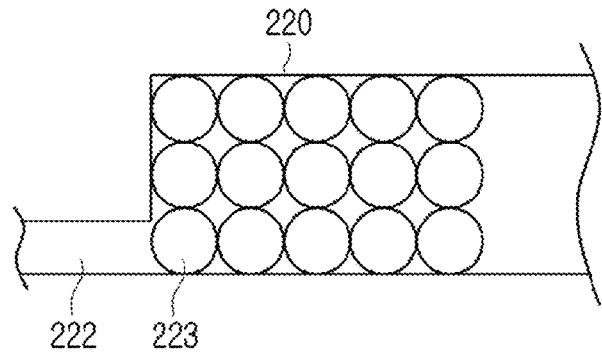
FIG. 4 is a diagram illustrating an enlarged outlet of a capture path.

The capture path 220 is a part that captures an analyte contained in the sample. The capture path 220 is located radially outward of the sample storage unit 210 and communicates with sample storage unit 210. As shown in FIGS. 2 and 3, the capture path 220 may have a zigzag shape, and include a capture means 223 such as silica beads therein. The inlet 221 and an outlet 222 are located at both ends of the capture path 220. The inlet 221 is located radially inward, and the outlet 222 is located radially outward, based on the through-hole H. A material containing the analyte contained in the sample is adsorbed onto the capture means 223. As shown in FIG. 4, since the capture means 223 is larger than the width of the outlet 222, the detachment from the capture path 220 is prevented.

The washing solution storage unit 230 is a chamber type, and located radially inward of the sample storage unit 210 and connected with the inlet 221 of the capture path 220. The washing solution stored in the washing solution storage unit 230 removes remaining components excluding the analyte from the material captured by the capture means 223 from the capture means 223 by washing. A washing solution injection hole 231 for injecting a washing solution from the outside is formed in the washing solution storage unit 230. After the washing solution is injected into the washing solution storage unit 230 through the washing solution injection hole 231, the washing solution injection hole 231 is sealed by double-sided tape. The washing solution stored in the washing solution storage unit 230 is introduced into the inlet 221 of the capture path 220 due to a centrifugal force generated when the chip for sample analysis 1000 is rotated.

The delay unit 240 is a part included between the capture path 220 and washing solution storage unit 230 such that a washing solution flows toward the capture path 220 from the washing solution storage unit 230. The delay unit 240 delays the passage of the washing solution introduced from the washing solution storage unit 230 such that the washing solution reaches the capture path 220 later than the sample when the chip for sample analysis 1000 is rotated for sample analysis.

Figure 5:
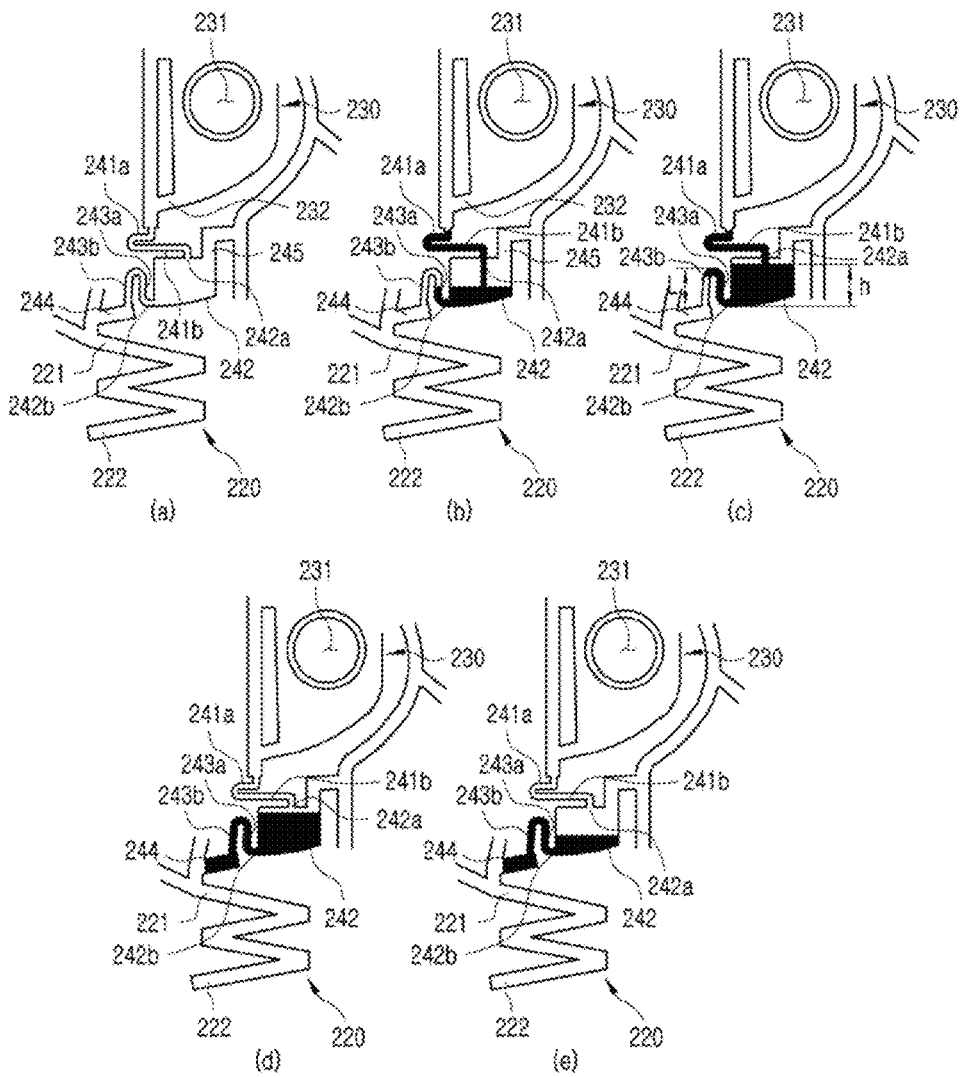
FIG. 5 is a diagram illustrating a delay unit that delays the passage of a washing solution introduced from a washing solution storage unit.

Referring to FIG. 5, the configuration of the delay unit 240 will be described in detail. The delay unit 240 includes an introduction channel 241, a delay chamber 242 and a delay channel 243.

The introduction channel 241 is a part which connects the washing solution storage unit 230 with the delay chamber 242, such that, when the chip for sample analysis 1000 is rotated, the washing solution stored in the washing solution storage unit 230 is introduced into the delay chamber 242. The introduction channel 241 includes a third path 241a extending away from the delay chamber 242 in a direction parallel to the width direction of the delay chamber 242 and a fourth path 241b extending closer to the delay chamber 242 in a direction parallel to the third path 241a at the end of the third path 241a.

The delay chamber 242 is a chamber type, and a part that stores the washing solution introduced by the introduction channel 241. The larger the capacity of the delay chamber 242, the later the introduction of the washing solution flowing toward the capture path 220. An outlet 242b through which the washing solution flows out is formed at the radially outermost side of the delay chamber 242.

The delay channel 243 is a part that is connected with an outlet 242b of the delay chamber 242 such that the introduction of a washing solution stored in the delay chamber 242 into the capture path 220 is delayed. Specifically, the delay channel 243 includes a first path 243a extending in a radially inward direction of the chip for sample analysis 1000 from the outlet 242b of the delay chamber and a second path 243b extending in radially outward direction of the chip for sample analysis 1000 from the end of the first path 243a.

The delay channel 243 allows the washing solution stored in the delay chamber 242 to be discharged into the capture path 220, when a predetermined amount or more of the washing solution is stored. That is, to introduce the washing solution into the second path 243b through the first path 243a, a predetermined amount or more of the washing solution has to be stored in the delay chamber 242. Here, the predetermined amount is an amount when the height (h) of the washing solution stored in the delay chamber 242 corresponds to the length (L) of the first path 243a. In this case, since a capillary force is greater than a centrifugal force generated by the rotation of the chip for sample analysis 1000, the washing solution may be introduced into the second path 243b through the first path 243a. That is, since the washing solution is not introduced into the capture path 220 until the washing solution in the delay chamber 242 reaches the predetermined amount, the washing solution reaches the capture path 220 later than the sample. Therefore, a phenomenon of introducing the washing solution into the capture path 220 before a material containing the analyte is captured in the capture path 220 may be prevented.

The first eluent storage unit 250 is a chamber type, and a part that is located inside the sample storage unit 210 in a radial direction of the chip for sample analysis 1000 and communicates with the inlet 221 of the capture path 220. A first eluent is stored in the first eluent storage unit 250. The first eluent is a solution for separating a material adsorbed onto the capture means 223 from the capture means 223. For example, the first eluent may be water. In the first eluent storage unit 250, a first eluent injection hole 251 for injecting the first eluent from the outside is formed. After the first eluent is injected into the first eluent storage unit 250 through the first eluent injection hole 251, the first eluent injection hole 251 is sealed by coupling with a cartridge 3000 to be described below. The first eluent stored in the first eluent storage unit 250 is introduced into a first eluent introduction path 253 due to a centrifugal force generated when the chip for sample analysis 1000 is rotated.

The first eluent introduction path 253 includes a fifth path 253a connected with an outlet 252 of the first eluent storage unit located at the radially outermost side of the first eluent storage unit 250 and extending in a radially inward direction of the chip for sample analysis 1000, and a sixth path 253b connected to the end of the fifth path 253a and extending in a radially outward direction of the chip for sample analysis 1000. Because of the configurations of the fifth path 253a and the sixth path 253b, when the chip for sample analysis 1000 is rotated, the first eluent is not introduced into the capture path 220, and when the chip for sample analysis 1000 is rotated again after rotation stops, the first eluent is introduced into the capture path 220. Therefore, after both of the sample and the washing solution are introduced into the capture path 220, the first eluent may be introduced into the capture path 220.

The second eluent storage unit 260 is a chamber type, and a part that is located outside of the sample storage unit 210 in a radial direction of the chip for sample analysis 1000 and communicates with the connection chamber 270 to be described below. A second eluent is stored in the second eluent storage unit 260. The second eluent is a solution containing an enzyme required for the gene amplification of an analyte and an indicator. Here, the indicator may be an Eriochrome Black T (EBT) indicator which is discolored in gene amplification. A second eluent injection hole 261 for injecting the second eluent from the outside is formed in the second eluent storage unit 260. After the second eluent is injected into the second eluent storage unit 260 through the second eluent injection hole 261, the second eluent injection hole 261 is sealed by coupling with a cartridge 3000 to be described below. The second eluent stored in the second eluent storage unit 260 is introduced into a second eluent introduction path 263 due to a centrifugal force generated when the chip for sample analysis 1000 is rotated.

The second eluent introduction path 263 includes a seventh path 263a connected with the outlet 262 of the second eluent storage unit located at the radially outermost side of the second eluent storage unit 260 and extending in a radially inward direction of the chip for sample analysis 1000, and an eighth path 263b connected to the end of the seventh path 263a and extending in a radially outward direction of the chip for sample analysis 1000. Due to the configurations of the seventh path 263a and the eighth path 263b, when the chip for sample analysis 1000 is rotated, the second eluent is not introduced into a connection chamber 270, and when the rotation of the chip for sample analysis 1000 stops, the second eluent is introduced into the connection chamber 270. Therefore, after both of the sample and the washing solution are introduced into the capture path 220, the second eluent can be introduced into the connection chamber 270.

The connection chamber 270 is a chamber type, and a part that is located outside the capture path 220 and the second eluent storage unit 260 in a radial direction of the chip for sample analysis 1000, and communicates with the outlet 222 of the capture path 220 and the eighth path 263b of the second eluent storage unit 260. Therefore, when the chip for sample analysis 1000 is rotated, a material passing through the capture path 220 or the second eluent introduction path 263 may be introduced into a waste solution chamber 271 and a collection chamber 272, which will be described below, via the connection chamber 270.

The waste solution chamber 271 is a chamber type, and a part located outside the connection chamber 270 in a radial direction of the chip for sample analysis 1000 and communicates with the connection chamber 270. Remaining unnecessary components excluding an analyte are stored in the waste solution chamber 271.

The waste solution chamber 271 may have a capacity having a size equal to sum of the amounts of the sample and the washing solution. A capillary valve may be formed at the connection path 273 connecting the connection chamber 270 and the waste solution chamber 271, thereby preventing the re-introduction of a waste solution stored in the waste solution chamber 271 into the connection chamber 270.

The collection chamber 272 is a chamber type, and a part that is located outside the connection chamber 270 in a radial direction of the chip for sample analysis 1000 and communicates with the connection chamber 270. In the collection chamber 272, the analyte separated from the capture path 220, the first eluent and the second eluent are stored. The analyte, first eluent and second eluent, which are stored in the collection chamber 272, are introduced into a detection chamber introduction path 276 due to a centrifugal force generated when the chip for sample analysis 1000 is rotated.

The detection chamber introduction path 276 includes a ninth path 276a connected with the outlet 275 located at the radially outermost side of the collection chamber 272 and extending in a radially inward direction of the chip for sample analysis 1000, and a tenth path 276b connected to the end of the ninth path 276a and extending in a radially outward direction of the chip for sample analysis 1000. Because of the configurations of the ninth path 276a and the tenth path 276b, when the chip for sample analysis 3000 is rotated, a material stored in the collection chamber 272 is not introduced into the connection chamber 270, and when the rotation of the chip for sample analysis 1000 stops, the material stored in the collection chamber 272 is introduced into an introduction channel 281.

The detection chamber 280 is a part in which the amplification and detection of an analyte are performed. To detect numerous viruses or pathogens at one time using one chip for sample analysis 1000, a plurality of detection chambers 280 are preferably included. FIG. 2 shows that an integrated process unit includes 20 detection chambers 280a, 280b, 280c, 280d, 280e, 280f, 280g, 280h, 280i, 280j, 280k, 280l, 280m, 280n, 280o, 280p, 280q, 280r, 280s and 280t, but the present application is not limited thereto. The integrated process unit possibly includes less than or more than 20 detection chambers 280. In each detection chamber 280, a different primer may be stored. A distance between each detection chamber and the through-hole H is preferably the same.

The introduction channel 281 is a part connected to the end of the tenth path 276b of the detection chamber introduction path 276 such that a material is introduced from the collection chamber 272 when the chip is rotated with a first rotation speed in a first direction for sample analysis. The introduction channel 281 may extend from the inlet through which a material is introduced from the collection chamber 272 in a first direction. Here, the first direction may be clockwise, and the first rotation speed may be 1000 rpm.

The introduction channel 281 may have an aliquoting structure such that a material is sequentially introduced due to a centrifugal force. The aliquoting structure is, as shown in FIG. 2, a structure in which a plurality of outlets extend radially outward of one introduction channel 281. Therefore, a material directed toward a first direction from an inlet through which a material is introduced from the collection chamber 272 may be sequentially introduced into a plurality of outlets of the introduction channel 281 due to a centrifugal force generated by the chip for sample analysis 1000.

Connection channels 282 are parts respectively extending to a plurality of detection chambers 280 from the plurality of outlets of the introduction channel 281, such that an analyte introduced from the introduction channel 281 into the detection chamber 280 passes through when the chip is rotated with a second rotation speed in a first direction for sample analysis. Here, the second rotation speed may be 5000 rpm. The connection channels 282 may be located outside the introduction channel 281 in a radial direction of the chip for sample analysis 1000, and formed smaller than the width of the introduction channel 281. Here, the second rotation speed may be 5000 rpm. Accordingly, since a radially outward centrifugal force applied to a material when the chip for sample analysis 1000 is rotated at a second rotation speed higher than the first rotation speed is greater than a capillary force exerted radially inward from the detection chamber 280, a material accommodated in each of the plurality of outlets of the introduction channel 281 may be introduced into the detection chamber 280. As shown in FIG. 2, among the plurality of connection channels 282a, 282b, 282c, 282d, 282e, 282f, 282g, 282h, 282i, 282j, 282k, 282l, 282m, 282n, 282o, 282p, 282q, 282r, 282s and 282t, from the collection chamber 272, the further the connection channel, the shorter the length. Since the centrifugal force applied to the material contained at the outlet of the introduction channel 281 decreases in the circumferential direction, the introduction to the detection chamber 280 is possible with a reduced centrifugal force.

The detection chambers 280a, 280b, 280c, 280d, 280e, 280f, 280g, 280h, 280i, 280j, 280k, 280l, 280m, 280n, 280o, 280p, 280q, 280r, 280s and 280t are a chamber type, and parts located outside the connection channel 282 in a radial direction of the chip for sample analysis 1000. In each detection chamber 280a, 280b, 280c, 280d, 280e, 280f, 280g, 280h, 280i, 280j, 280k, 280l, 280m, 280n, 280o, 280p, 280q, 280r, 280s or 280t, a different primer is included. Therefore, by observing the discoloration of an indicator included in the second eluent according to a reaction or non-reaction of an analyte introduced into each detection chamber 280a, 280b, 280c, 280d, 280e, 280f, 280g, 280h, 280i, 280j, 280k, 280l, 280m, 280n, 280o, 280p, 280q, 280r, 280s or 280t with a primer, the analysis of an analyte contained in a sample may be achieved.

2. Device for Sample Analysis

Figure 6:
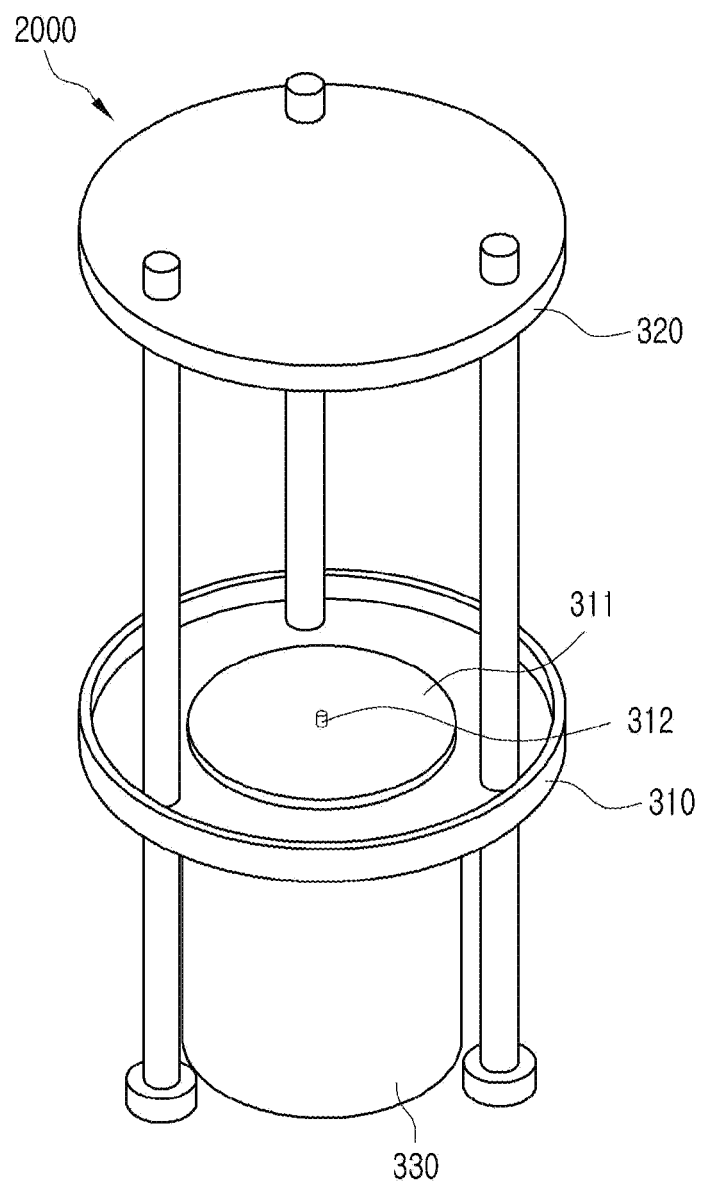
FIG. 6 is a perspective view illustrating a device for sample analysis according to an embodiment of the present application.

Referring to FIG. 6, a device for sample analysis 2000 according to an exemplary embodiment of the present application will be described in further detail.

The device for sample analysis 2000 according to an exemplary embodiment of the present application includes a lower member 310, an upper member 320 and a driving motor 330.

A temperature adjustment unit 311 is included on the top surface of the lower member 310. The temperature adjustment unit 311 is a part providing a temperature required for a genetic amplification process of an analyte introduced into the detection chamber 280 of the chip for sample analysis 1000. A column 312 extending upwards from the temperature adjustment unit 311 is formed in the center of the temperature adjustment unit 311. A through-hole H is coupled with the column 312 and serves as a rotation shaft when the chip for sample analysis 1000 is rotated by a driving motor 330 to be described below.

The upper member 320 is a part mounted on the lower member 310 such that up-and-down movement with respect to the lower member 310 is possible. In the upper member 320, the chip for sample analysis 1000 is accommodated. Until the chip for sample analysis 1000 accommodated in the upper member 320 comes into contact with the temperature adjustment unit 311, the upper member 320 moves upwards or downwards with respect to the lower member 310.

The driving motor 330 is a part that is mounted under the lower membrane 310 to allow the chip for sample analysis 1000 seated on the temperature adjustment unit 311 to rotate. As the chip for sample analysis 1000 is rotated by the driving motor 330, the pretreatment, amplification and detection of a sample may be performed.

3. Cartridge

Figure 7:
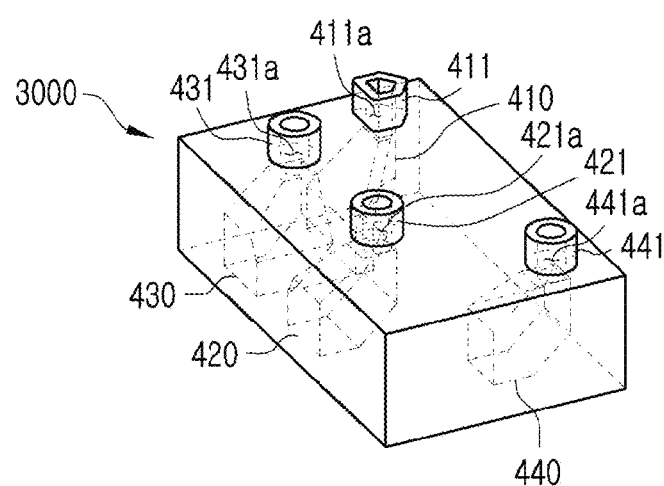
FIG. 7 is a perspective view illustrating a cartridge according to an embodiment of the present application.
Figure 8:
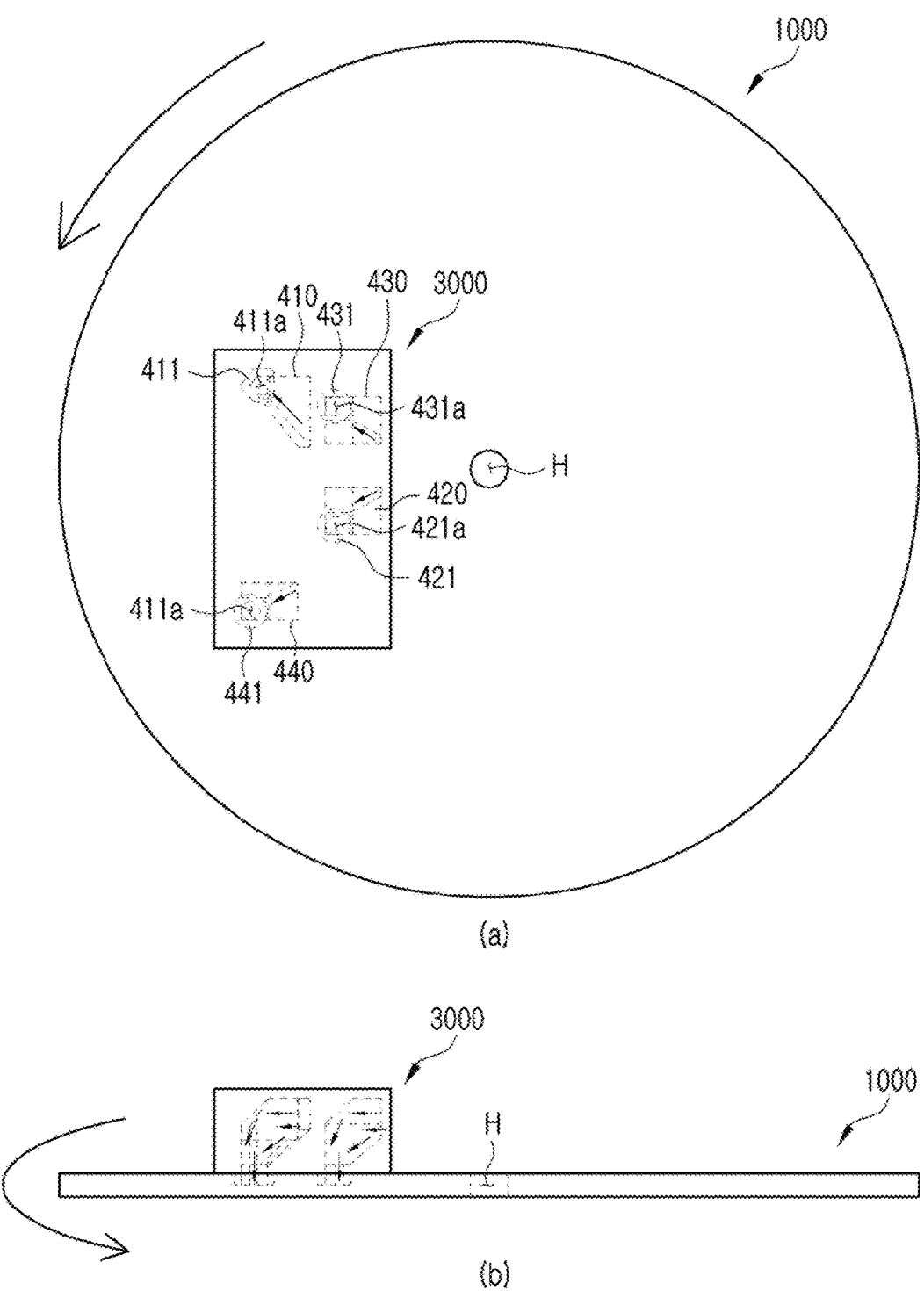
FIG. 8 is a diagram illustrating that a centrifugal force is applied to a solution stored in a cartridge while the cartridge-mounted chip for sample analysis is rotated.
Figure 9:
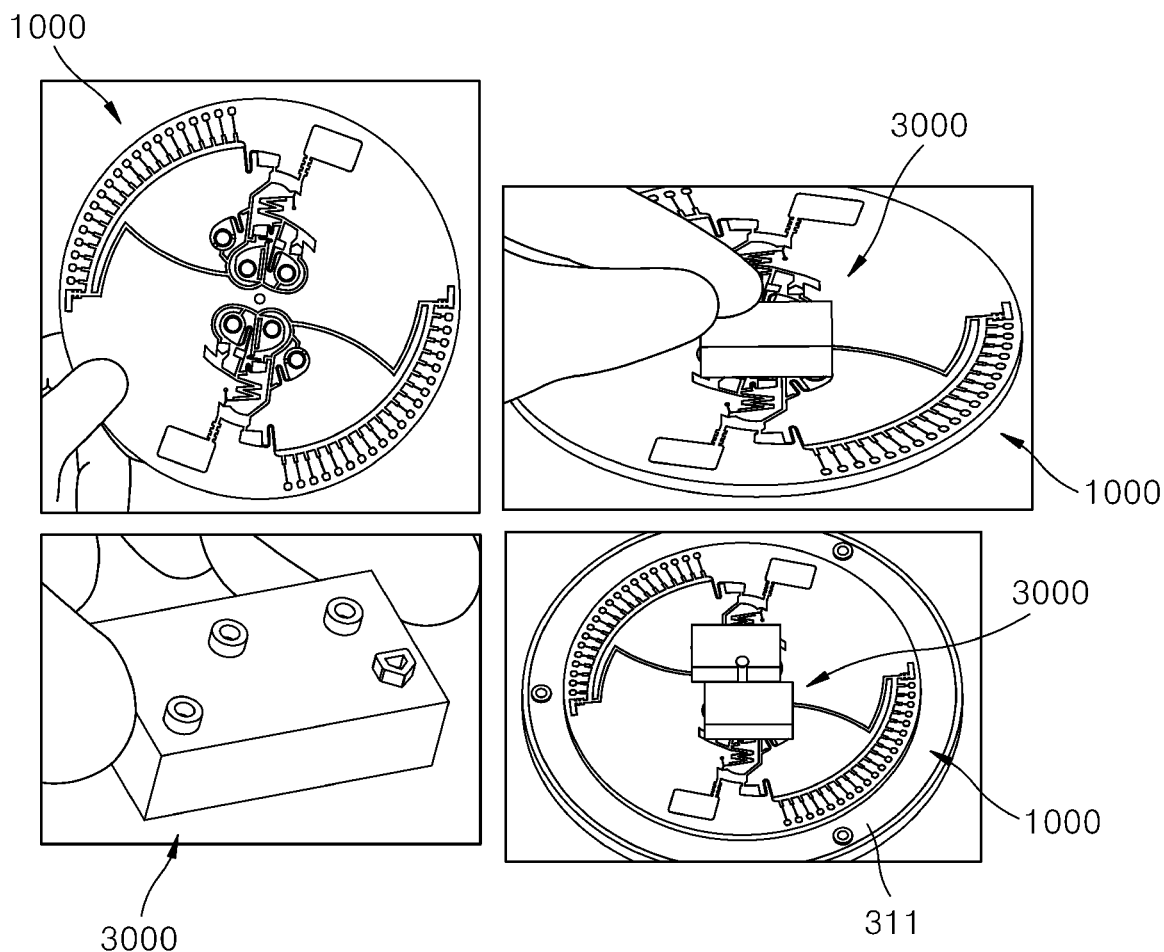
FIG. 9 is a set of images showing a chip for sample analysis, a cartridge and a cartridge-mounted chip for sample analysis according to embodiments of the present application.

Referring to FIGS. 7 and 8, a cartridge 3000 according to an exemplary embodiment of the present application will be described in detail with reference to FIGS. 7 and 8.

The cartridge 3000 according to an exemplary embodiment of the present application is a part mounted on the above-described chip for sample analysis 1000 such that a solution is injected into at least one storage unit of a sample storage unit 210, a washing solution storage unit 230, a first eluent storage unit 250 and a second eluent storage unit 260 of the chip for sample analysis 1000.

Referring to FIG. 7, the cartridge 3000 according to an exemplary embodiment of the present application includes a first solution storage unit 410, a second solution storage unit 420, a third solution storage unit 430 and a fourth solution storage unit 440.

A lysis buffer solution for elution of an analyte contained in a sample is stored in the first solution storage unit 410. The first solution storage unit 410 has a first inlet 411 projecting from one side to be inserted into the sample storage unit 210 of the chip for sample analysis 1000. The first inlet 411 may be detachably inserted into the sample storage unit 210. The first inlet 411 preferably communicates with the first solution storage unit 410 at the furthest location from a rotation axis such that a solution can be injected through the first inlet 411 when the chip for sample analysis 1000 is rotated. Accordingly, in the rotation of the chip for sample analysis 1000, as shown in FIG. 8, a centrifugal force may be fully applied to the solution stored therein, and thus a so-called dead space phenomenon in which the solution is not discharged from the inside to the outside and remains may be prevented. A first injection groove 411a is formed through the first inlet 411 such that the solution stored in the first solution storage unit 410 can be discharged. When the chip for sample analysis 1000 is rotated, the solution stored in the first solution storage unit 410 is discharged to the outside through the first injection groove 411a.

A washing solution for washing and removing remaining components, except an analyte, of the material captured by the capture means 223 is stored in the second solution storage unit 420. The second solution storage unit 420 has a second inlet 421 projecting from one side to be inserted into the washing solution storage unit 230 of the chip for sample analysis 1000. The second inlet 421 may be detachably inserted into the washing solution storage unit 230. The second inlet 421 preferably communicates with the second solution storage unit 420 at the furthest location from the rotation axis such that a solution can be injected through the second inlet 421 when the chip for sample analysis 1000 is rotated. Therefore, in the rotation of the chip for sample analysis 1000, as shown in FIG. 8, a centrifugal force may be fully applied to the solution stored therein, and thus a so-called dead space phenomenon in which the solution is not discharged from the inside to the outside and remains may be prevented. A second injection groove 421a is formed through the second inlet 421 such that the solution stored in the second solution storage unit 420 can be discharged. When the chip for sample analysis 1000 is rotated, the solution stored in the second solution storage unit 420 is discharged to the outside through the second injection groove 421a.

A first eluent for separating an analyte adsorbed onto the capture means 233 is stored in the third solution storage unit 430. The third solution storage unit 430 has a third inlet 431 projecting from one side to be inserted into the first eluent storage unit 250 of the chip for sample analysis 1000. The third inlet 431 may be detachably inserted into the first eluent storage unit 250. The third inlet 431 preferably communicates with the third solution storage unit 430 at the furthest location from a rotation axis such that a solution can be injected through the third inlet 431 when the chip for sample analysis 1000 is rotated. Therefore, in the rotation of the chip for sample analysis 1000, as shown in FIG. 8, a centrifugal force may be fully applied to the solution stored therein, and thus a so-called dead space phenomenon in which the solution is not discharged from the inside to the outside and remains may be prevented. A third injection groove 431a is formed through the third inlet 431 such that the solution stored in the third solution storage unit 430 can be discharged. When the chip for sample analysis 1000 is rotated, the solution stored in the third solution storage unit 430 is discharged to the outside through the third injection groove 431a.

In the fourth solution storage unit 440, a second eluent containing an enzyme required for genetic amplification of an analyte and an indicator is stored. The fourth solution storage unit 440 has a fourth inlet 441 projecting from one side to be inserted into the second eluent storage unit 260 of the chip for sample analysis 1000. The fourth inlet 441 may be detachably inserted into the second eluent storage unit 260. The fourth inlet 441 preferably communicates with the fourth solution storage unit 440 at the furthest location from a rotation axis such that a solution can be injected through the fourth inlet 441 when the chip for sample analysis 1000 is rotated. Therefore, in the rotation of the chip for sample analysis 1000, as shown in FIG. 8, a centrifugal force may be fully applied to the solution stored therein, and thus a so-called dead space phenomenon in which the solution is not discharged from the inside to the outside and remains may be prevented. A fourth injection groove 441a is formed through the fourth inlet 441 such that the solution stored in the fourth solution storage unit 440 can be discharged. When the chip for sample analysis 1000 is rotated, the solution stored in the fourth solution storage unit 440 is discharged to the outside through the fourth injection groove 441a.

4. Verification Experiment 1

An experiment was performed to verify diagnostic excellence using the chip for sample analysis 1000, device for sample analysis 2000 and cartridge 3000 according to embodiments of the present application. In the following verification experiments, genetic amplification was performed using the isothermal amplification reaction.

First, an experiment was performed to detect *E. coli* O157:H7 contained in milk. As a sample, 25 µL of milk was used, and the concentration of the *E. coli* O157:H7 contained in milk was $4\times10^3$ cells/µL.

First, the prepared sample was loaded into a 75 µL of a lysis buffer solution stored in the first solution storage unit 410 of the cartridge 3000, and *E. coli* O157:H7 was lysed in the lysis buffer solution for 1 minute.

Figure 13A:
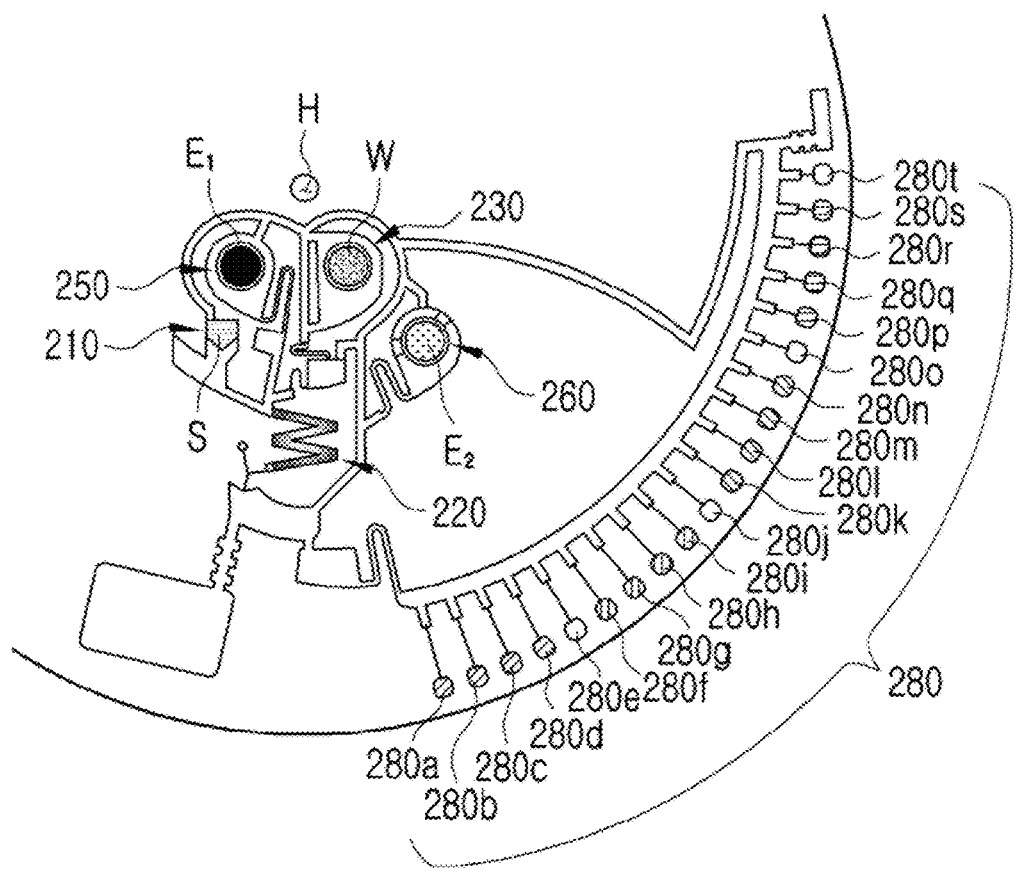
FIGS. 13A to 13I are diagrams illustrating a process of analyzing an analyte using a chip for sample analysis according to an embodiment of the present application.

In addition, the cartridge 3000 was mounted on the chip for sample analysis 1000 such that each of the inlets 411, 421, 431 and 441 thereof was inserted into each of the storage units 210, 230, 250 and 260 of the chip. The cartridge 3000 was mounted on the chip for sample analysis 1000 such that a solution was injected into each of the storage units 210, 230, 250 and 260 of the chip for sample analysis in each of the solution storage units of the cartridge 3000. FIG. 13A is a diagram illustrating that, after the cartridge 3000 was mounted, a solution was injected into each of the storage units 210, 230, 250 and 260.

Figure 13B:
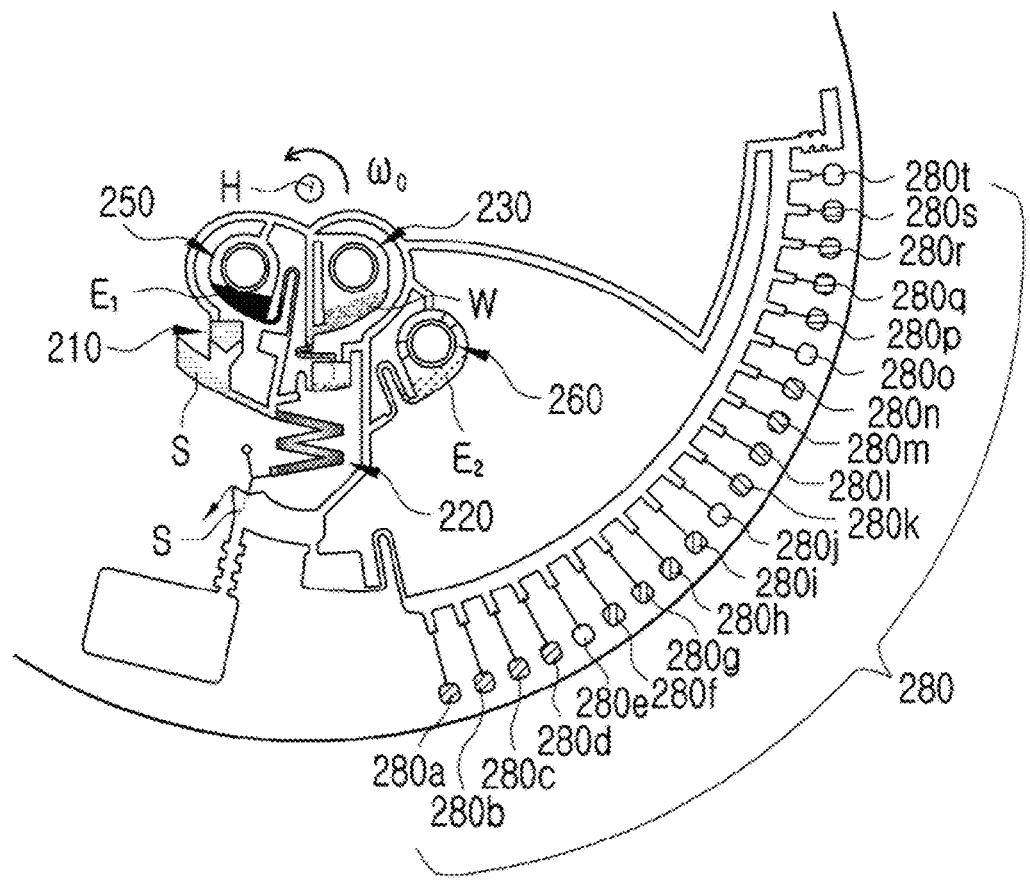

Afterward, as shown in FIG. 13B, the chip for sample analysis 1000 was rotated counterclockwise at a rotation speed of 5,000 rpm (ω0). The sample stored in the sample storage unit 210 was introduced into the capture path 220, and remaining unnecessary materials except an analyte adsorbed onto the capture means 223 of the capture path 220 were introduced into the waste solution chamber 271 through the connection chamber 270 and the connection channel 273.

Figure 13C:
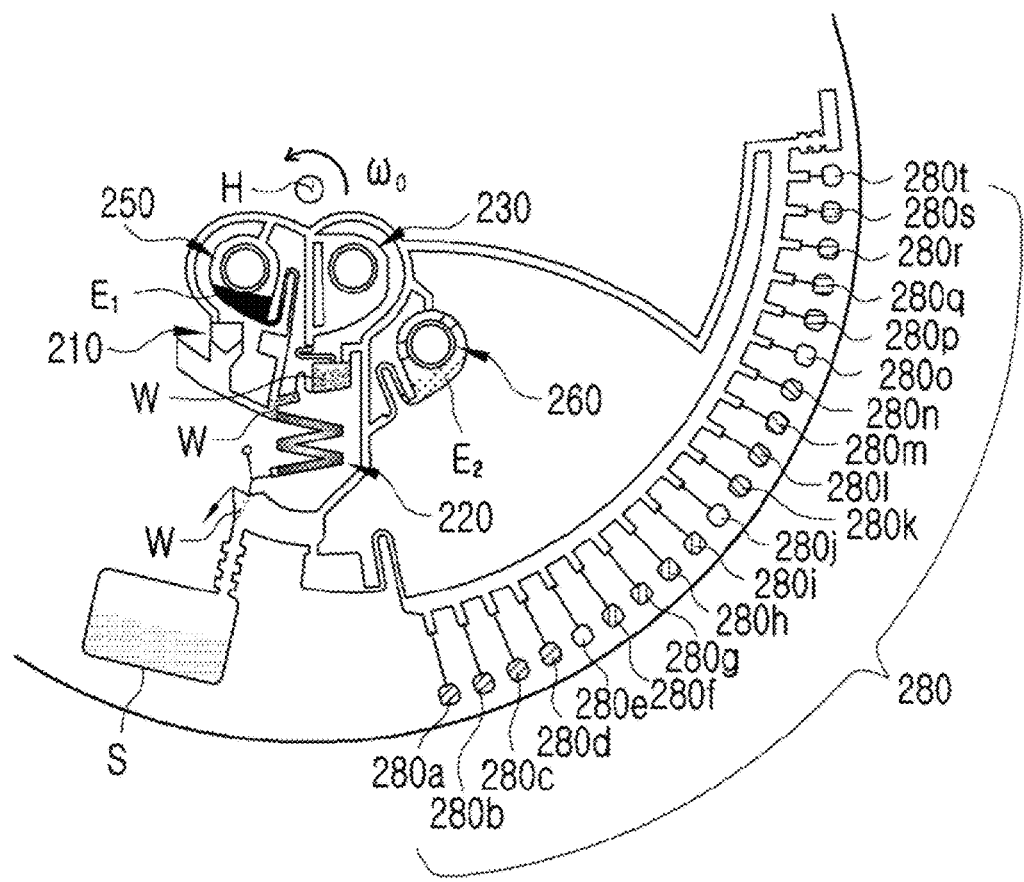

Afterward, as shown in FIG. 13C, the washing solution stored in the washing solution storage unit 230 was introduced into the capture path 220 through the delay unit 240, and remaining components except the analyte from the material captured by the capture means 223 were washed from the capture means 223 and also introduced into the waste solution chamber 271 through the connection chamber 270 and the connection channel 273.

Figure 13D:
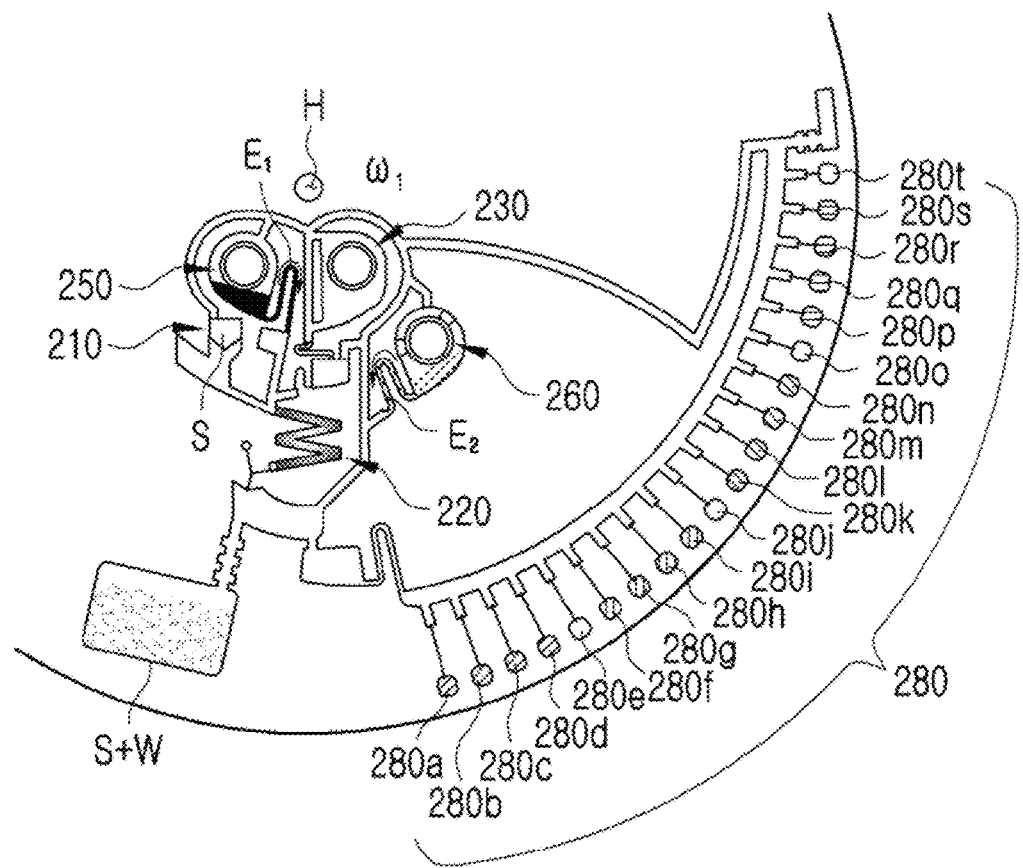

Afterward, as shown in FIG. 13D, the rotation of the chip for sample analysis 1000 was stopped (ω1). When the rotation of the chip for sample analysis 1000 was stopped, a centrifugal force applied to the solution was removed, and therefore, the first eluent and the second eluent stored in the first eluent storage unit 250 and the second eluent storage unit 260, respectively, passed through the first eluent introduction path 253 and the second eluent introduction path 263 due to a capillary force.

Figure 13E:
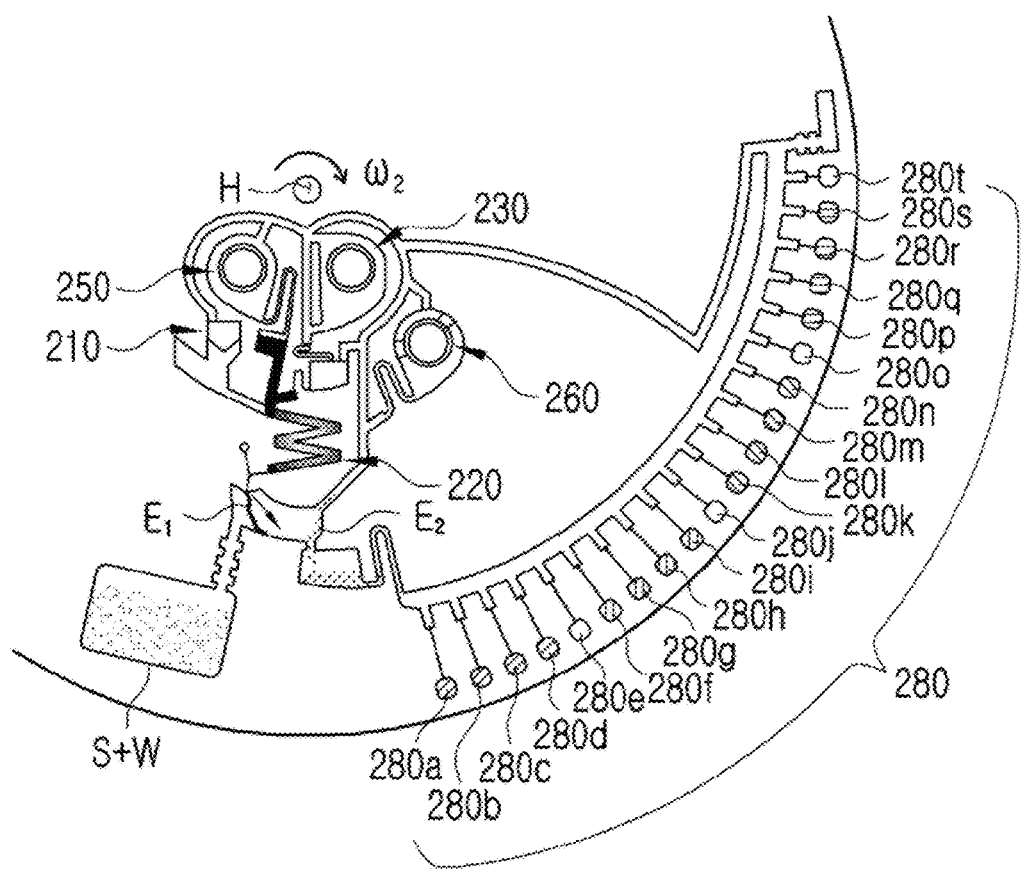

Next, as shown in FIG. 13E, the chip for sample analysis 1000 was rotated clockwise at a rotation speed of 5000 rpm (ω2). The first eluent was introduced into the capture path 220 to separate the material adsorbed onto the capture means 223 from the capture means 223, and then introduced into the collection chamber 272 via the connection chamber 270, and the second eluent was introduced into the collection chamber 272 via the connection chamber 270.

Figure 13F:
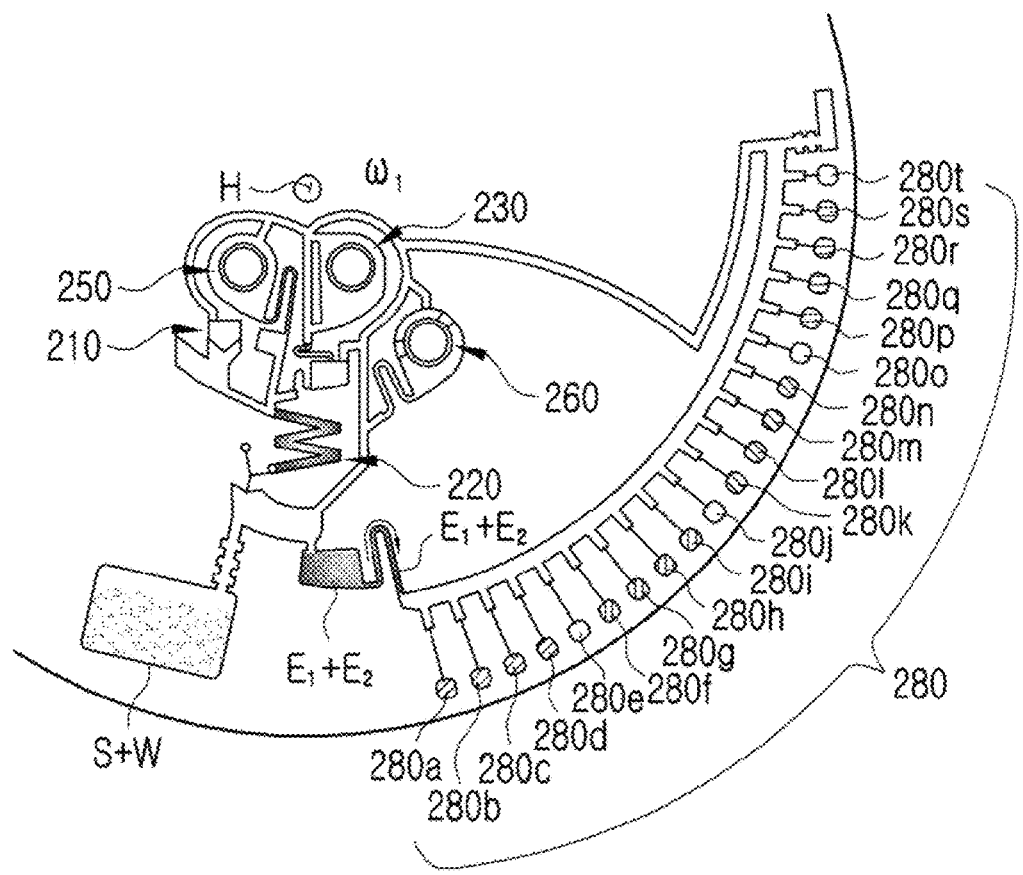

Next, as shown in FIG. 13F, the rotation of the chip for sample analysis 1000 was stopped (ω1). When the rotation of the chip for sample analysis 1000 was stopped, a centrifugal force applied to the solution was removed, the material stored in the collection chamber 272 passed through the detection chamber introduction path 276 due to a capillary force.

Figure 13G:
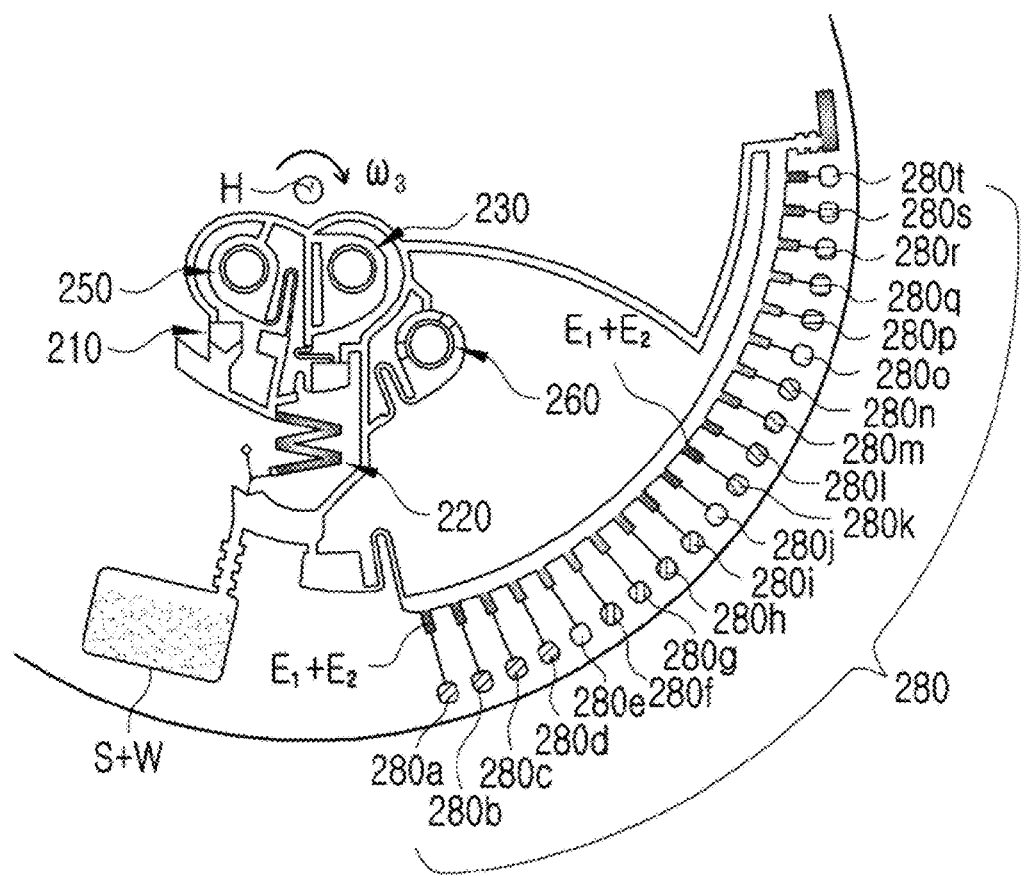

Next, as shown in FIG. 13G, the chip for sample analysis 1000 was rotated clockwise at a rotation speed of 1000 rpm (ω3). The material passing through the detection chamber introduction path 276 was introduced into an introduction channel 281, and the material introduced into the introduction channel 281 by the rotation of the chip for sample analysis 1000 was introduced clockwise into a plurality of outlets of the introduction channels 281 extending along the circumferential direction.

Figure 13H:
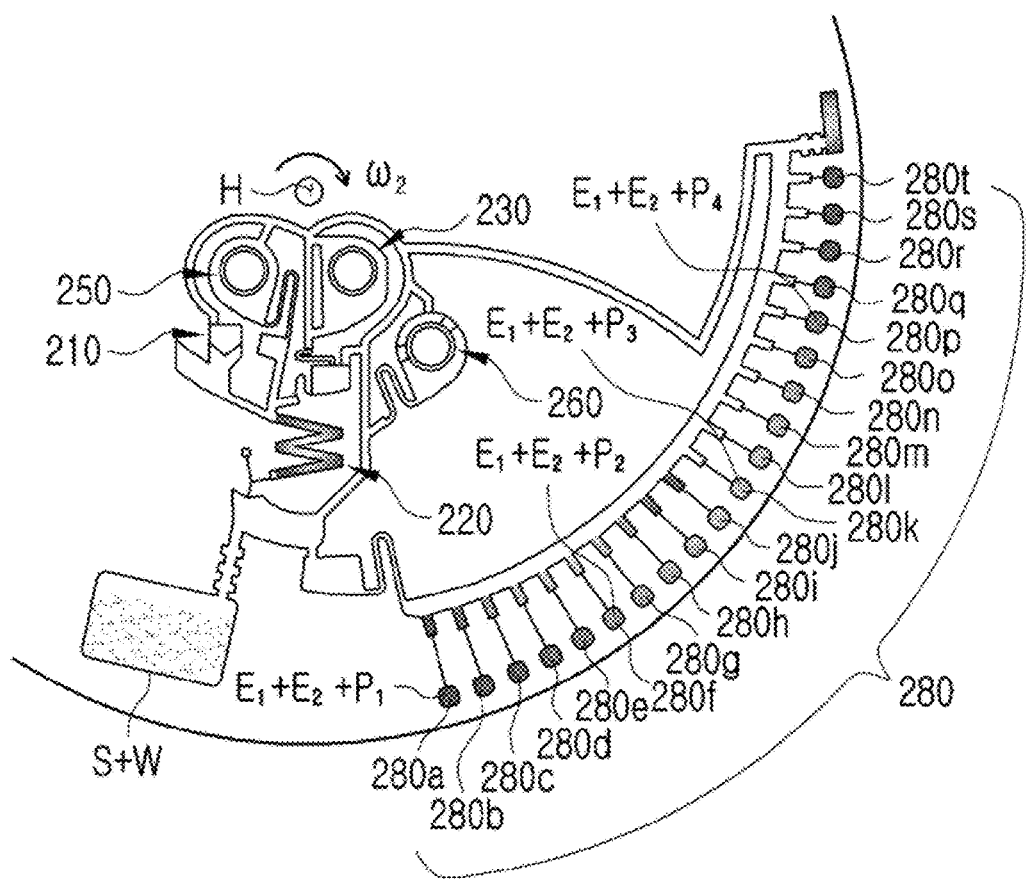

Next, as shown in FIG. 13H, the chip for sample analysis 1000 was rotated clockwise at a rotation speed of 5000 rpm (ω2). It can be confirmed that the material stored in the plurality of outlets of the introduction channel 281 passed through a plurality of connection channels 282 having a smaller width than the outlet and then was introduced into each of the detection chambers 280a, 280b, 280c, 280d, 280e, 280f, 280g, 280h, 280i, 280j, 280k, 280l, 280m, 280n, 280o, 280p, 280q, 280r, 280s and 280t.

Figure 13I:
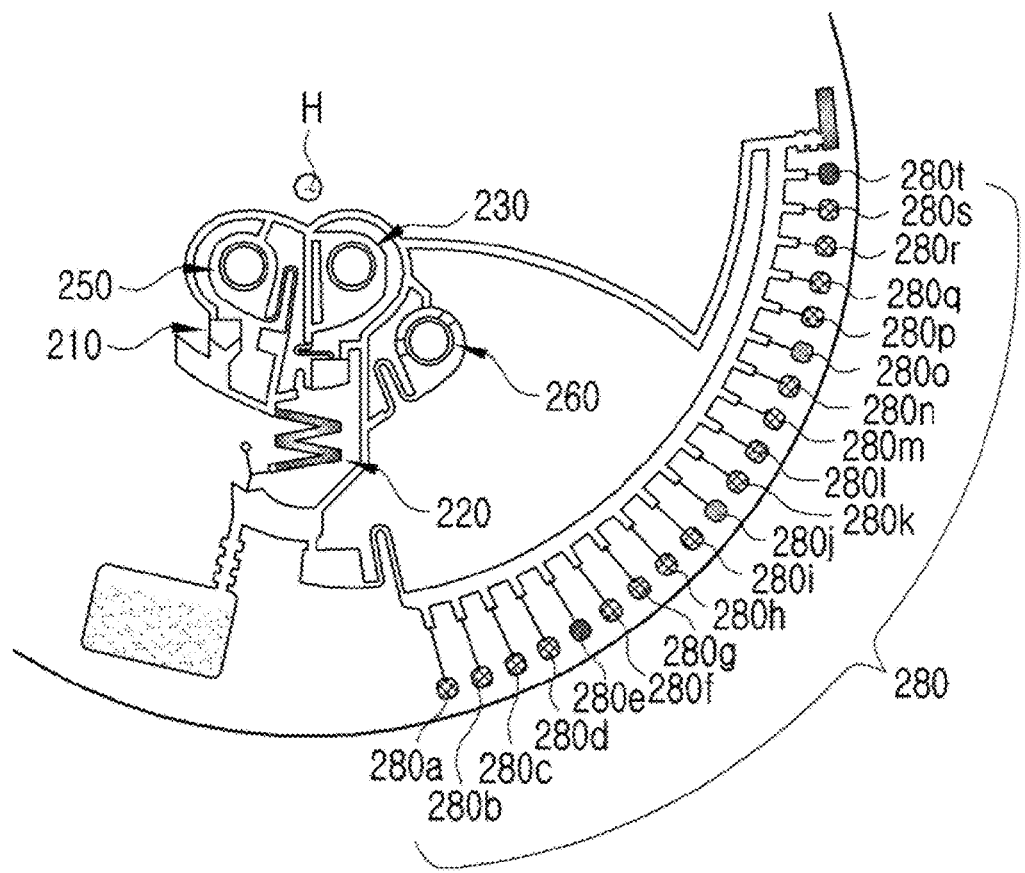

And then, the detection chambers 280a, 280b, 280c, 280d, 280e, 280f, 280g, 280h, 280i, 280j, 280k, 280l, 280m, 280n, 280o, 280p, 280q, 280r, 280s and 280t were heated using a temperature adjustment unit 311 at 63° C. for 1 hour. Here, when the genetic amplification progresses, as shown in FIG. 13I, the discoloration (violet--->blue) of an EBT indicator contained in the second eluent occurs.

Among the plurality of detection chambers, an *E. coli* O157:H primer was stored in the first to fourth detection chambers 280a, 280b, 280c and 280d, a *Salmonella typhimurium* primer was stored in the sixth to ninth detection chambers 280f, 280g, 280h and 280i, a *Vibrio parahaemolyticus* primer was stored in the eleventh to fourteenth detection chambers 280k, 280l, 280m and 280n, and a *Listeria monocytogenes* primer was stored in the sixteenth to nineteenth detection chambers 280p, 280q, 280r and 280s.

No primer was stored in the fifth, tenth, fifteenth and twentieth detection chambers 280*d*, 280*i*, 280*o* and 280*t*.

Figure 10:
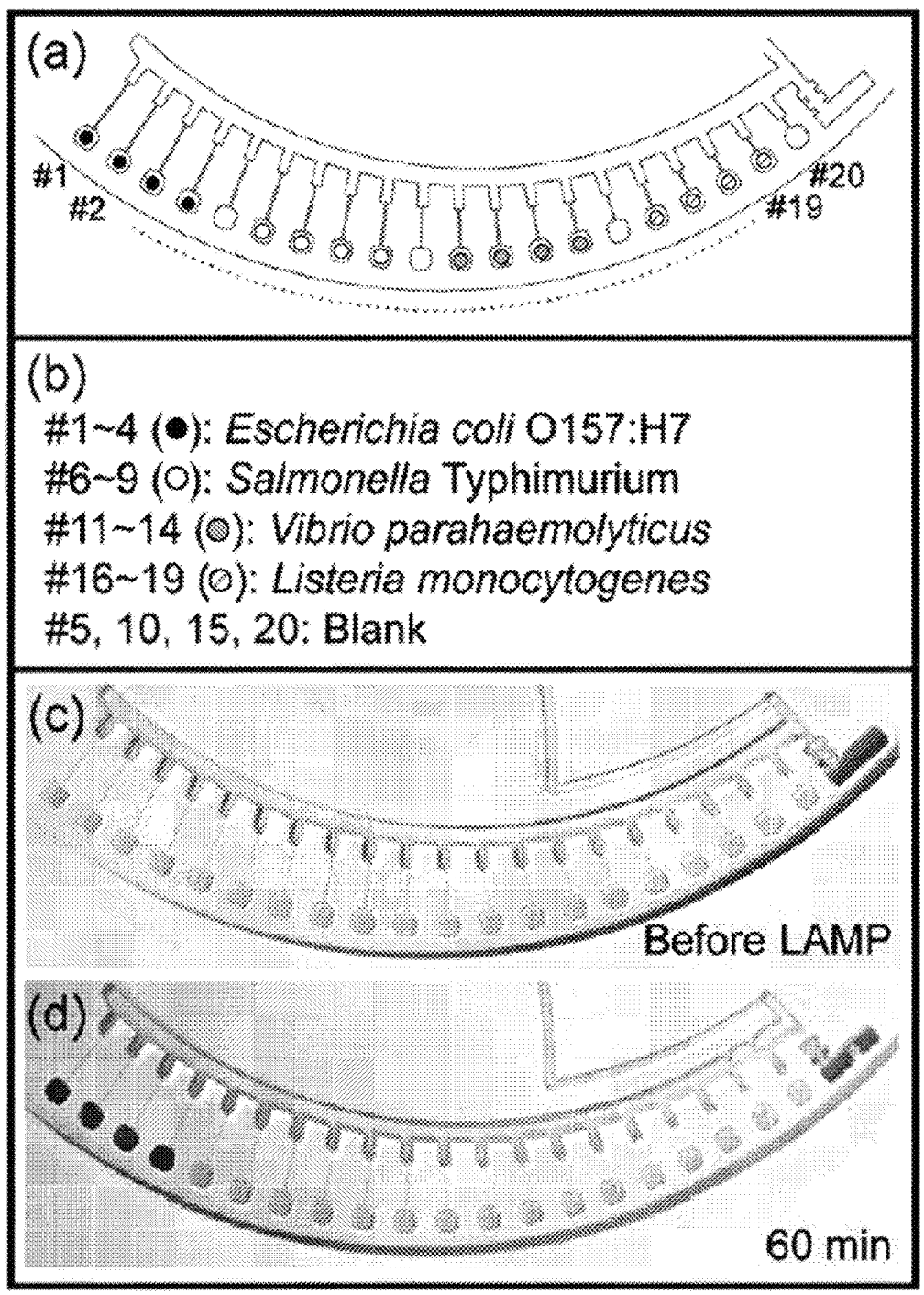
FIGS. 10 to 12 are diagrams illustrating the results of diagnosing pathogens using a chip for sample analysis, a cartridge and a device for sample analysis according to embodiments of the present application.

As a result of the experiment, as shown in FIG. 10, it can be confirmed that only the colors of the first to fourth detection chambers 280*a*, 280*b*, 280*c* and 280*d* turned blue. Therefore, the result that the diagnosis of a specific pathogen can be exactly and simply performed by using the chip for sample analysis 1000, device for sample analysis 2000 and cartridge 3000 according to embodiments of the present application can be obtained.

5. Verification Experiment 2

An experiment was performed to confirm whether various pathogens can be diagnosed at the same time using the chip for sample analysis 1000, device for sample analysis 2000 and cartridge 3000 according to embodiments of the present application.

The experimental process was the same as described in 4. Verification Experiment 1, and the experiment was performed by changing samples into (1) 25 μL milk:*E. coli* O157:H7 and *S. typhimurium*, each present at a concentration of $4 \times 10^3$ cells/μL, (2) 25 μL milk:*E. coli* O157:H7, *S. typhimurium* and *V. parahaemolyticus*, each present at a concentration of $4 \times 10^3$ cells/μL, and (3) 25 μL milk:*E. coli* O157:H7, *S. typhimurium*, *V. parahaemolyticus* and *L. monocytogenes*, each present at a concentration of $4 \times 10^3$ cells/μL.

Figure 11:
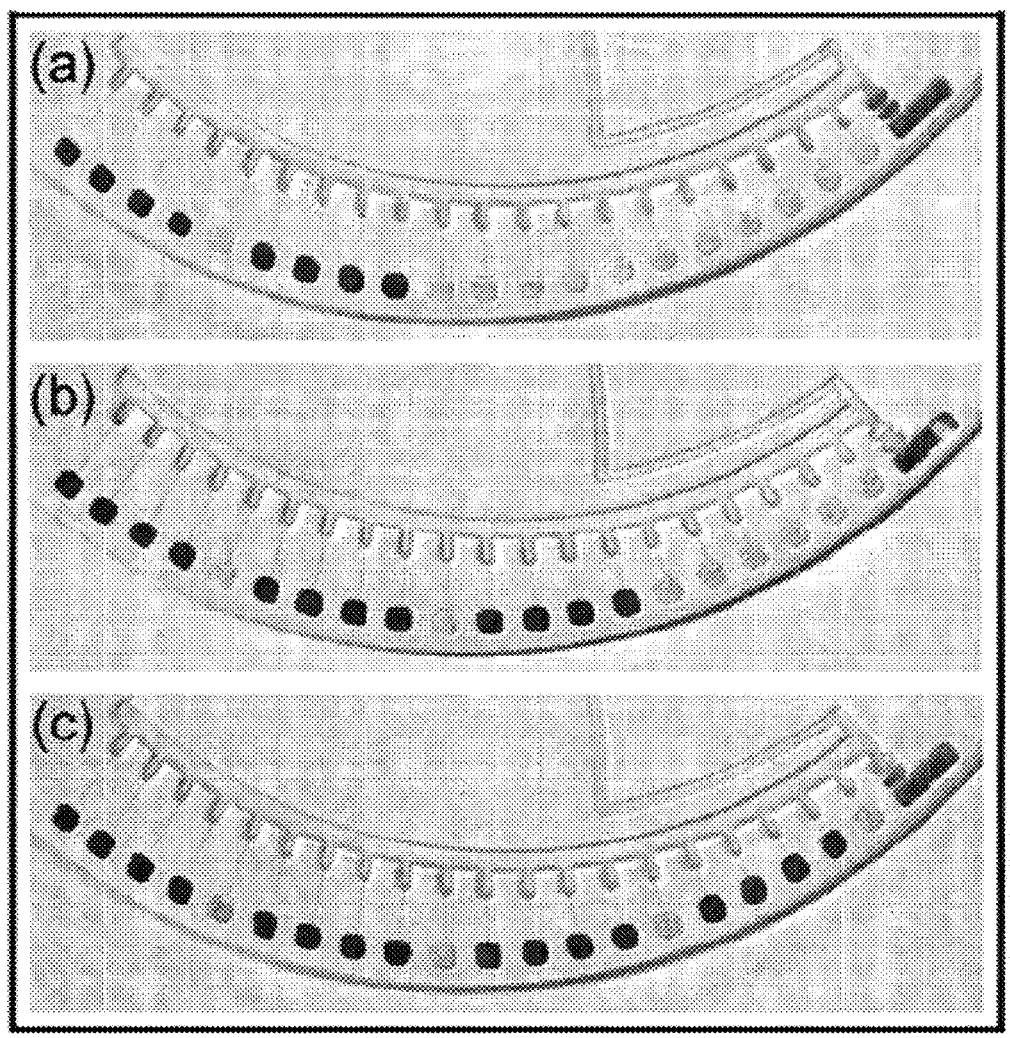

As a result of the experiment, as shown in FIG. 11, it can be confirmed that, even when the types of pathogens contained in the sample increase, each pathogen was able to be diagnosed.

6. Verification Experiment 3

An experiment was performed to confirm the limit of detection (LOD) of a pathogen using the chip for sample analysis 1000, device for sample analysis 2000 and cartridge 3000 according to embodiments of the present application.

The experimental process was the same as described in 4. Verification Experiment 1, and samples used herein were 25 μL milk containing all of *E. coli* O157:H7, *S. typhimurium*, *V. parahaemolyticus* and *L. monocytogenes*, and particularly, the experiment was performed with three samples, for example, (1) a sample containing $10^4$ cells of a pathogen, (2) a sample containing $10^3$ cells of a pathogen, and (3) a sample containing $10^2$ cells of a pathogen.

Figure 12:
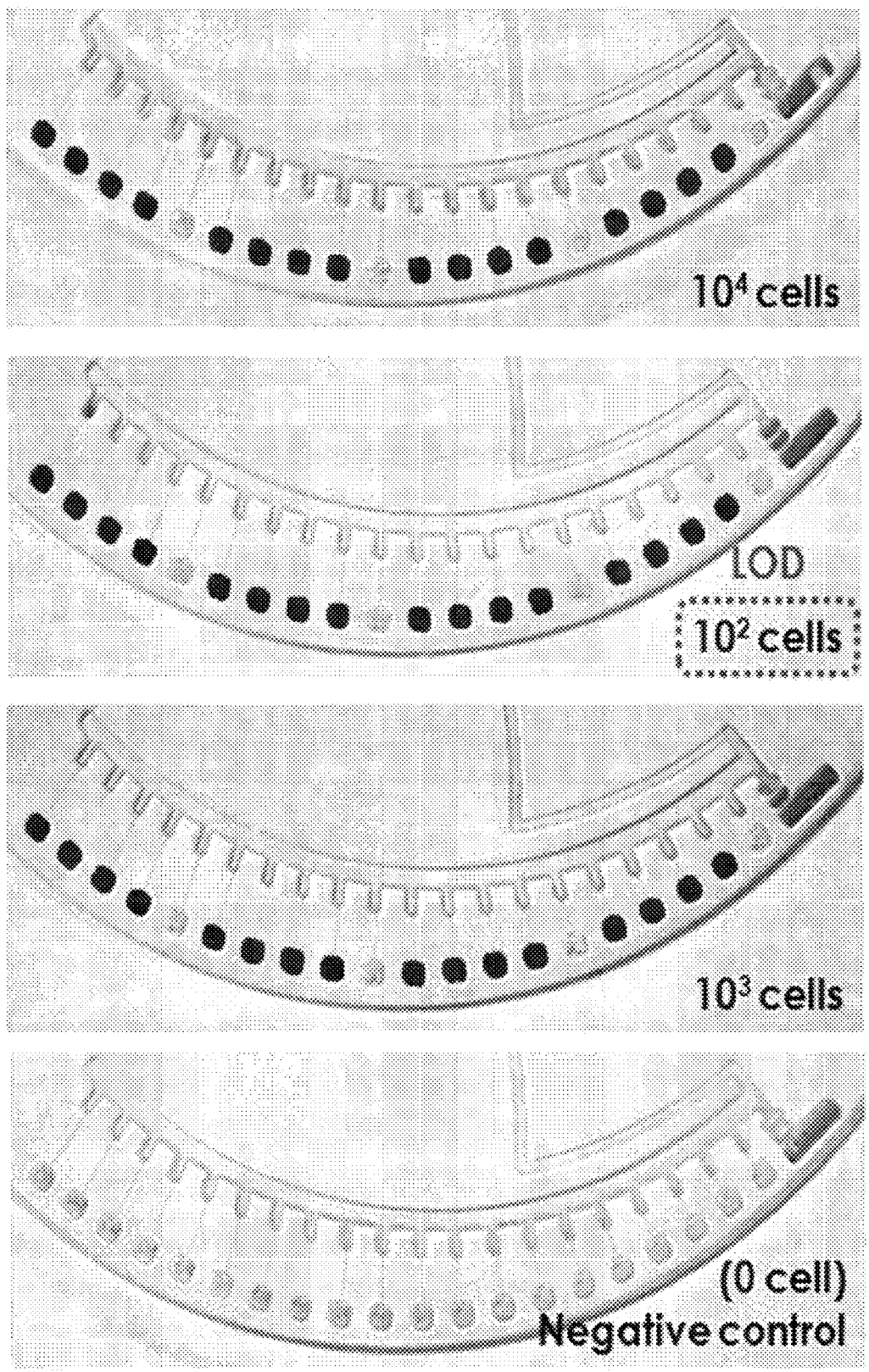

As a result of the experiment, as shown in FIG. 12, even when the sample contains 100 cells of a pathogen, it was confirmed that the diagnosis of the pathogen is possible.

That is, it can be confirmed that the LOD of the pathogen using the chip for sample analysis 1000, device for sample analysis 2000 and cartridge 3000 according to embodiments of the present application was $10^2$ cells.

As above, in the specification, the present application has been described with reference to embodiments illustrated in the drawings to be easily understood and reproduced by those of ordinary skill in the art. However, the embodiments are merely exemplary, and it should be understood by those of ordinary skill in the art that various modifications and equivalents can be made from the embodiments of the present application. Therefore, the scope of the present application should be determined by the accompanying claims.

EXPLANATION OF REFERENCE NUMERALS

100: body
200*a*, 200*b*: integrated process unit
210: sample storage unit
211: sample injection hole
220: capture path
221: inlet
222: outlet
223: capture means
230: washing solution storage unit
231: washing solution injection hole
240: delay unit
241: introduction channel
241*a*: third path
241*b*: fourth path
242: delay chamber
242*a*: inlet
242*b*: outlet
243: delay channel
243*a*: first path
243*b*: second path
250: first eluent storage unit
251: first eluent injection hole
253: first eluent introduction path
253*a*: fifth path
253*b*: sixth path
260: second eluent storage unit
261: second eluent injection hole
262: outlet
263: second eluent introduction path
263*a*: seventh path
263*b*: eighth path
270: connection chamber
271: waste solution chamber
272: collection chamber
273: connection path
275: outlet
276: detection chamber introduction path
276*a*: ninth path
276*b*: tenth path
280: detection chamber
281: introduction channel
282: connection channel
310: lower member
311: temperature adjustment unit
312: column
320: upper member
330: driving motor
410: first solution storage unit
411: first inlet
420: second solution storage unit
421: second inlet
430: third solution storage unit
431: third inlet
440: fourth solution storage unit
441: fourth inlet
1000: chip for sample analysis
2000: device for sample analysis
3000: cartridge
H: through-hole
S: sample
W: washing solution
E1: first eluent
E2: second eluent

The invention claimed is:

1. A chip for sample analysis, comprising:
a sample storage unit;
a capture path configured to capture an analyte contained in a sample and communicating with the sample storage unit;

a washing solution storage unit communicating with the capture path; and
a delay unit included between the capture path and the washing solution storage unit such that a washing solution flowing from the washing solution storage unit to the capture path passes through,
wherein, when the chip is rotated for sample analysis, the delay unit is configured to delay the passage of the washing solution introduced from the washing solution storage unit such that the washing solution reaches the capture path later than the sample,
wherein the delay unit comprises:
a delay chamber capable of storing a washing solution directed to the capture path from the washing solution storage unit;
an introduction channel included between the washing solution storage unit and the delay chamber such that the washing solution flows from the washing solution storage unit to the delay chamber; and
a delay channel included between the delay chamber and the capture path such that the washing solution stored in the delay chamber is discharged when stored at a predetermined amount or more,
wherein the delay channel comprises:
a first path extending radially inward from an outlet of the delay chamber; and
a second path extending radially outward from the end of the first path, the first path and the second path being configured to have the washing solution flow in opposite directions to each other, and
wherein a length of the first path with respect to a radially inward direction corresponds to a discharge level of the washing solution stored in the delay chamber, such that the washing solution stored in the delay chamber is discharged when having reached the discharge level or more,
wherein the introduction channel comprises:
a third path extending away from the delay chamber in a direction parallel to a width direction of the delay chamber, the third path being configured to have the washing fluid flow away from the delay chamber; and
a fourth path extending closer to the delay chamber in a direction parallel to the third path from an end of the third path, the third path and the fourth path being configured to have the washing solution flow in opposite directions to each other,
wherein the third path is connected to a farther side of the washing solution storage unit from a rotational axis of the chip, and the fourth path is positioned farther than the third path from the rotational axis of the chip and is connected to the delay chamber, which is positioned farther than the fourth path from the rotational axis of the chip,
wherein the third path only extends away from the delay chamber, and the fourth path only extends closer to the delay chamber, and
wherein the delay chamber comprises:
an outlet side formed linearly along a radial direction and connected to the first path through the outlet; and
an inlet side formed linearly and perpendicularly to the outlet side and connected to the fourth path through an inlet, the inlet side being positioned radially closer from the axis than the discharge level.

2. The chip of claim 1, wherein the sample storage unit is located radially inward of the capture path.

3. The chip of claim 1, wherein the washing solution storage unit is located radially inward of the sample storage unit.

4. The chip of claim 3, further comprising:
a first eluent storage unit located radially inward of the sample storage unit, communicating with the capture path, and storing the first eluent for separating an analyte captured in the capture path therein; and
a second eluent storage unit located radially outward of the sample storage unit, and storing a second eluent for detecting the analyte therein.

5. The chip of claim 4, further comprising:
a connection chamber located radially outward of the capture path and the second eluent storage unit, and communicating with an outlet of the capture path and the second eluent storage unit;
a waste solution chamber communicating with the connection chamber to be located radially outward of the connection chamber, and storing a sample not captured in the capture path and a washing solution passing through the capture path when the chip is rotated for sample analysis; and
a collection chamber communicating with the connection chamber to be located radially outward of the connection chamber and storing an analyte separated by the first eluent, the first eluent passing through the capture path, and the second eluent passing through the connection chamber.

6. The chip of claim 4, wherein an injection hole for injecting a solution is formed in each of the sample storage unit, the washing solution storage unit, the first eluent storage unit and the second eluent storage unit.

7. The chip of claim 1, wherein the outlet is included at the radially outermost side of the delay chamber, and the delay channel is connected to the outlet of the delay chamber.

8. The chip of claim 1, further comprising:
a plurality of detection chambers communicating with the capture path, configured to introduce the analyte, and storing a different primer for detecting the analyte.

9. A device for sample analysis, comprising:
the chip for sample analysis of claim 1;
a lower member on which the chip for sample analysis is mounted, and comprising a temperature adjustment unit on the top surface thereof;
an upper member mounted on the lower member to facilitate up-and-down movement with respect to the lower member; and
a driving motor mounted under the lower member to rotate the chip for sample analysis.

* * * * *